(12) United States Patent
Smith

(10) Patent No.: US 9,251,169 B2
(45) Date of Patent: Feb. 2, 2016

(54) SYSTEMS AND METHODS FOR CREATING PHOTO COLLAGES

(71) Applicant: UDC Software LLC, Minneapolis, MN (US)

(72) Inventor: Adam Smith, Minneapolis, MN (US)

(73) Assignee: UDC Software LLC, Minneapolis, MN (US)

( * ) Notice: Subject to any disclaimer, the term of this patent is extended or adjusted under 35 U.S.C. 154(b) by 0 days.

(21) Appl. No.: 14/159,986

(22) Filed: Jan. 21, 2014

(65) Prior Publication Data

US 2014/0204125 A1    Jul. 24, 2014

Related U.S. Application Data

(60) Provisional application No. 61/849,086, filed on Jan. 18, 2013.

(51) Int. Cl.
*G06F 17/30*    (2006.01)
*G06T 11/00*    (2006.01)

(52) U.S. Cl.
CPC ........ *G06F 17/30244* (2013.01); *G06T 11/001* (2013.01)

(58) Field of Classification Search
CPC ..................................................... G06T 3/4038
See application file for complete search history.

(56) References Cited

U.S. PATENT DOCUMENTS

| 2004/0085578 | A1* | 5/2004 | Quek et al. .................... 358/1.18 |
| 2004/0091146 | A1* | 5/2004 | Kim et al. ..................... 382/162 |
| 2005/0147322 | A1* | 7/2005 | Saed .............................. 382/284 |
| 2006/0184038 | A1* | 8/2006 | Smith et al. ................... 600/476 |
| 2006/0203261 | A1* | 9/2006 | Kacker .......................... 358/1.6 |
| 2007/0296824 | A1* | 12/2007 | Paine et al. ................. 348/222.1 |
| 2008/0133258 | A1* | 6/2008 | Kontogouris ..................... 705/1 |
| 2009/0154841 | A1* | 6/2009 | Choi et al. ..................... 382/307 |
| 2011/0058057 | A1* | 3/2011 | Tokunaga et al. .......... 348/222.1 |
| 2011/0103683 | A1* | 5/2011 | Tokunaga et al. ............. 382/164 |
| 2011/0169985 | A1* | 7/2011 | Cooper ......................... 348/241 |

(Continued)

OTHER PUBLICATIONS

Splashnology Magazine, "How to make a high quality and beautiful Photo-mosaic," published on 2011, retrieved from http://mag.splashnology.com/article/how-to-make-a-high-quality-and-beautiful-photo-mosaic/480/ on May 23, 2014.*

Splashnology Magazine, "How to make a high quality and beautiful Photo-mosaic," published on 2011, retrieved from http://mag.splashnology.com/article/how-to-make-a-high-quality-and-beautiful-photo-mosaic/480/ on Sep. 18, 2014, selected pages.*

(Continued)

*Primary Examiner* — Zhengxi Liu
(74) *Attorney, Agent, or Firm* — Winthrop & Weinstine, P.A.

(57) ABSTRACT

Embodiments of the present disclosure include a computer-implemented method for creating a final mosaic image. The method includes receiving a main image from a database of images. The method includes generating a grid overlay having one or more grid cells, the grid overlay being coupled with the main image such that the one or more grid cells each include a portion of the main image to create one or more image cells. The method also determines a tint value for each of the one or more image cells. The method also includes receiving one or more tile images from the database of images, and positioning one of the one or more tile images into each of the one or more image cells to create one or more tiled cells. The method also comprises assigning the tile image positioned in each of the tiled cells the tint value determined for the image cell that each of the tile images has been positioned into to create a polished image.

14 Claims, 30 Drawing Sheets
(20 of 30 Drawing Sheet(s) Filed in Color)

(56) References Cited

U.S. PATENT DOCUMENTS

2012/0113288 A1* 5/2012 Kobayashi ............... 348/222.1
2012/0250986 A1* 10/2012 Masuko .................... 382/164

OTHER PUBLICATIONS

Silvers, Robert. Photomosaics: putting pictures in their place. Diss. Massachusetts Institute of Technology, 1996.*

* cited by examiner

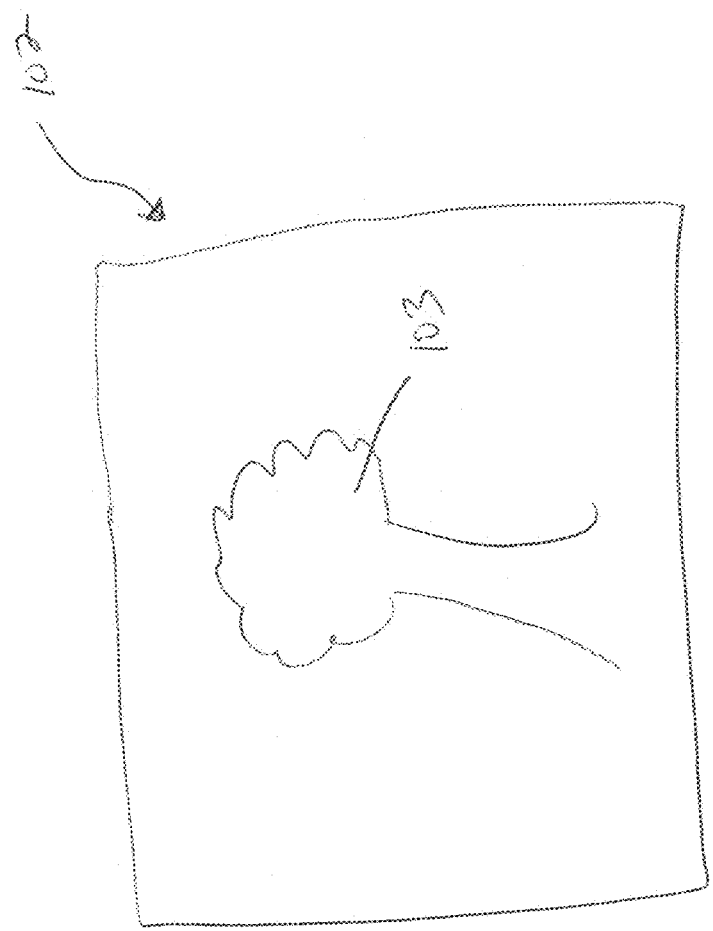

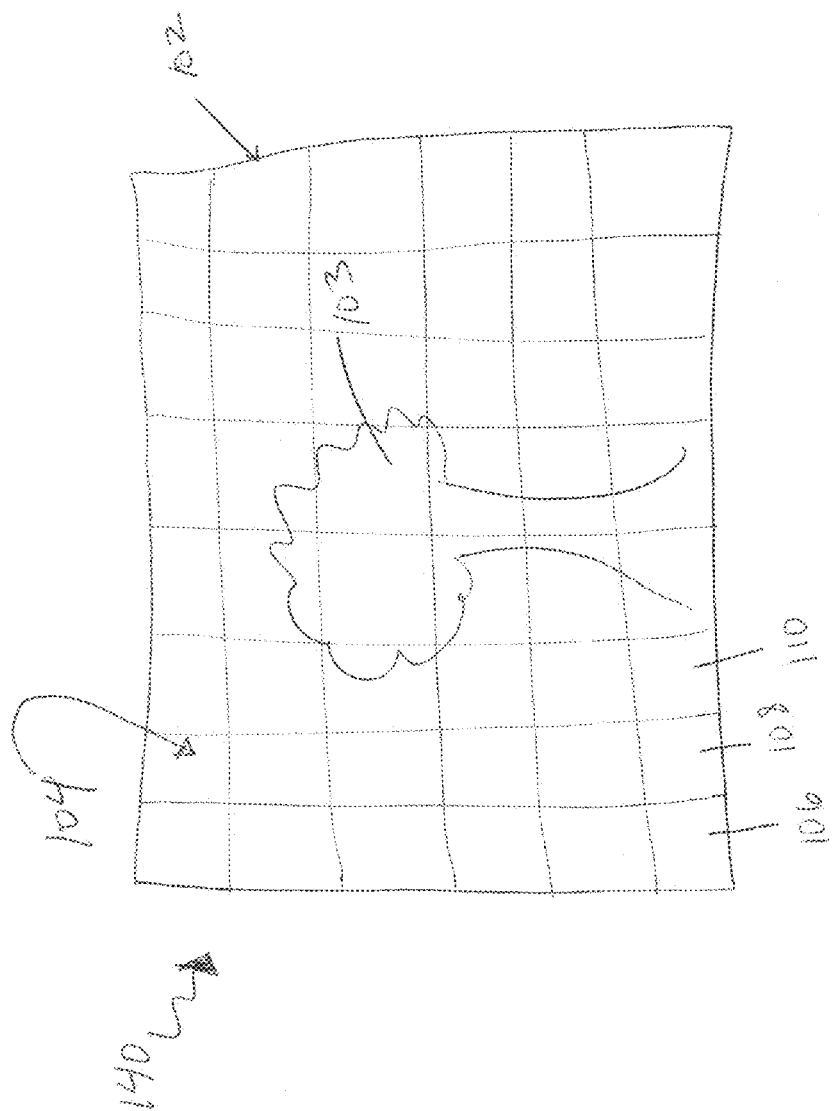

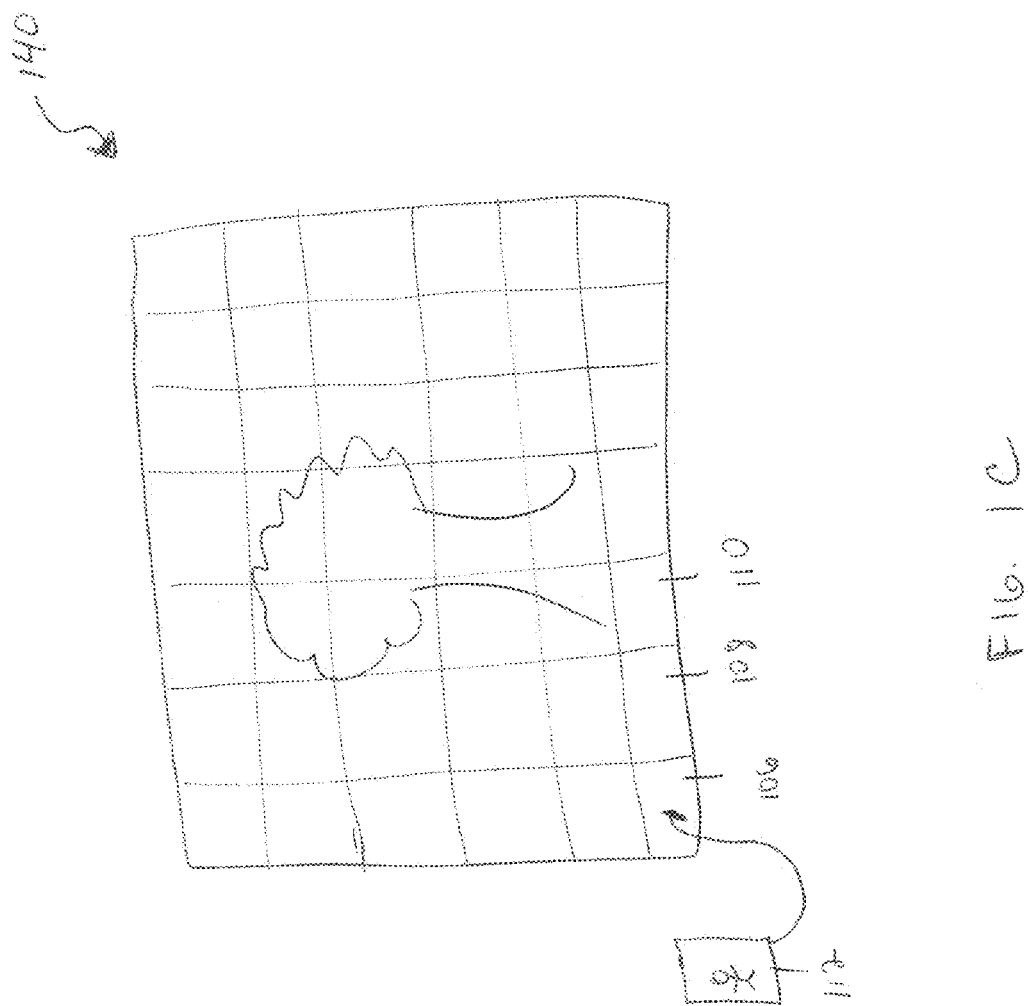

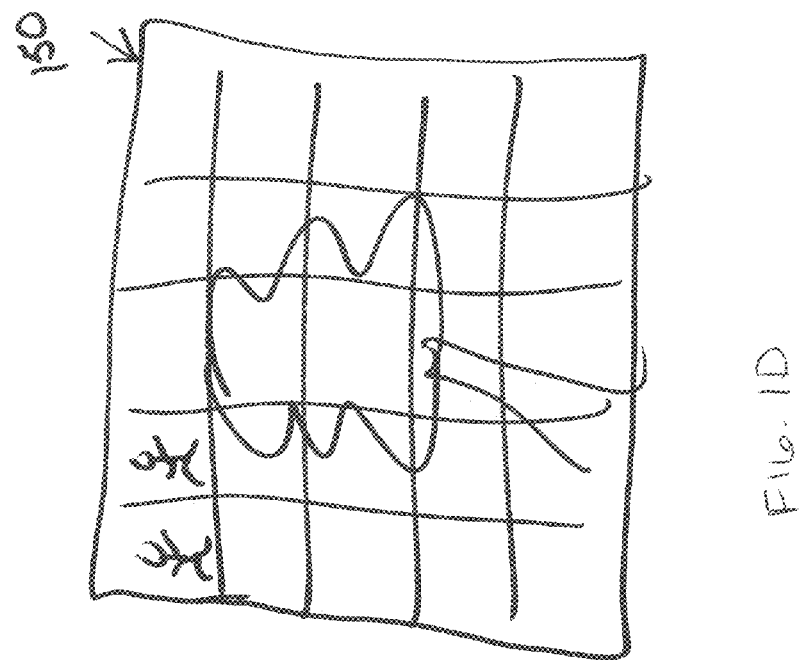
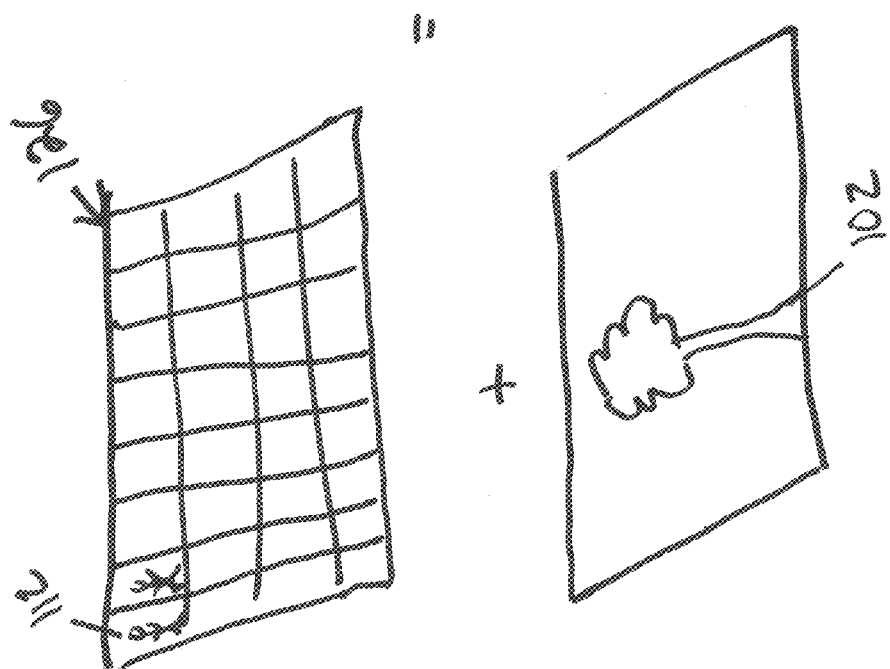
FIG. 1D

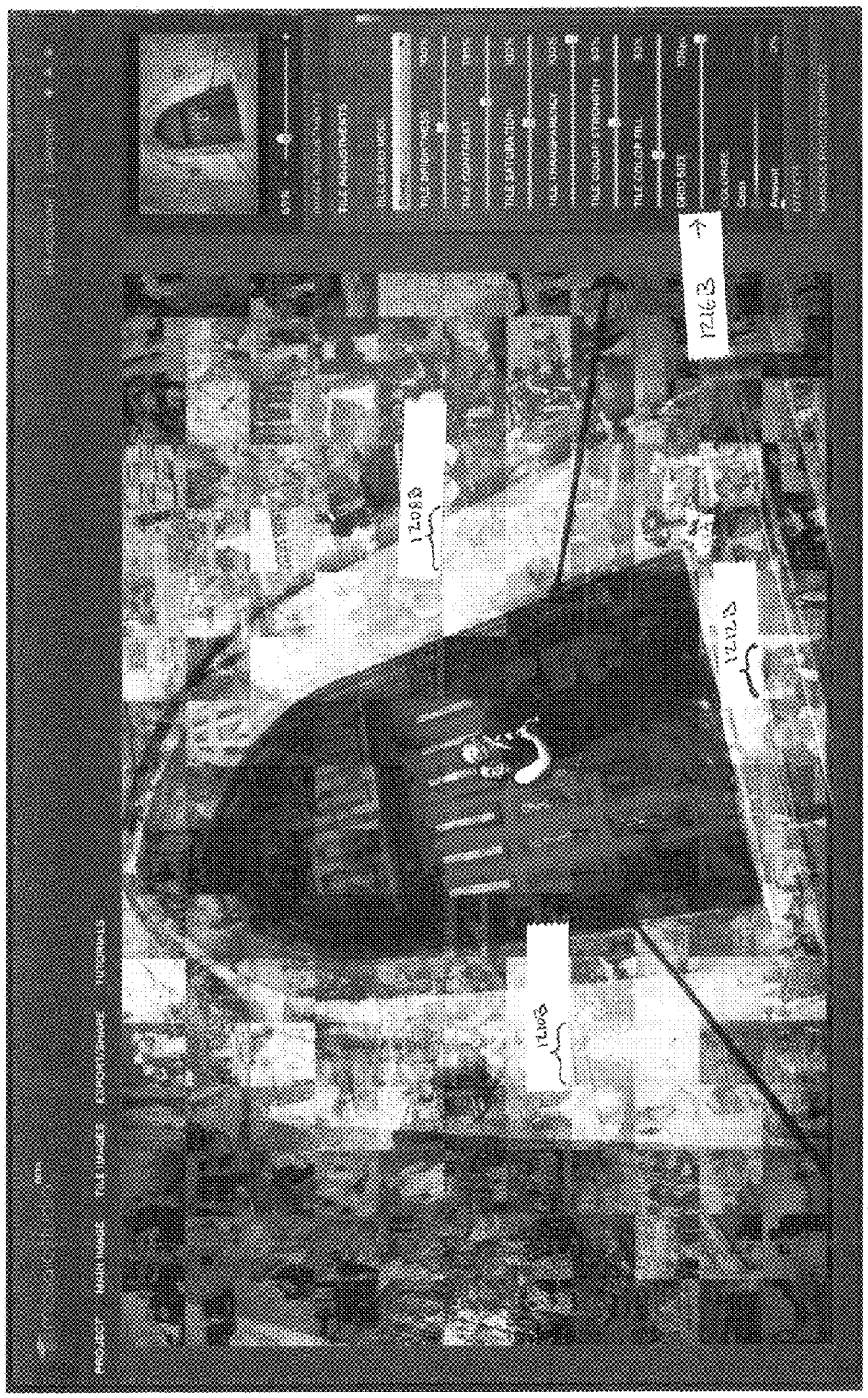

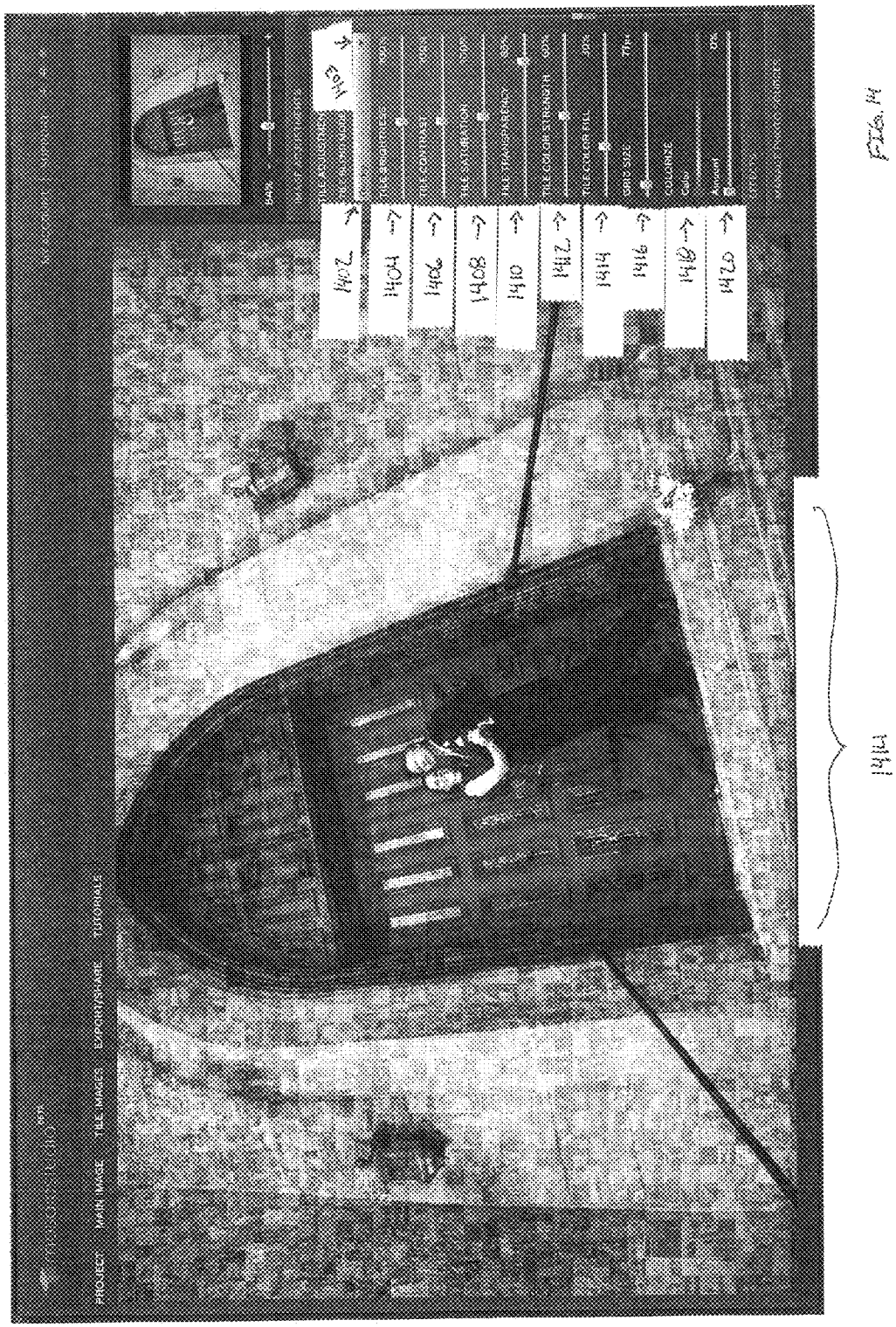

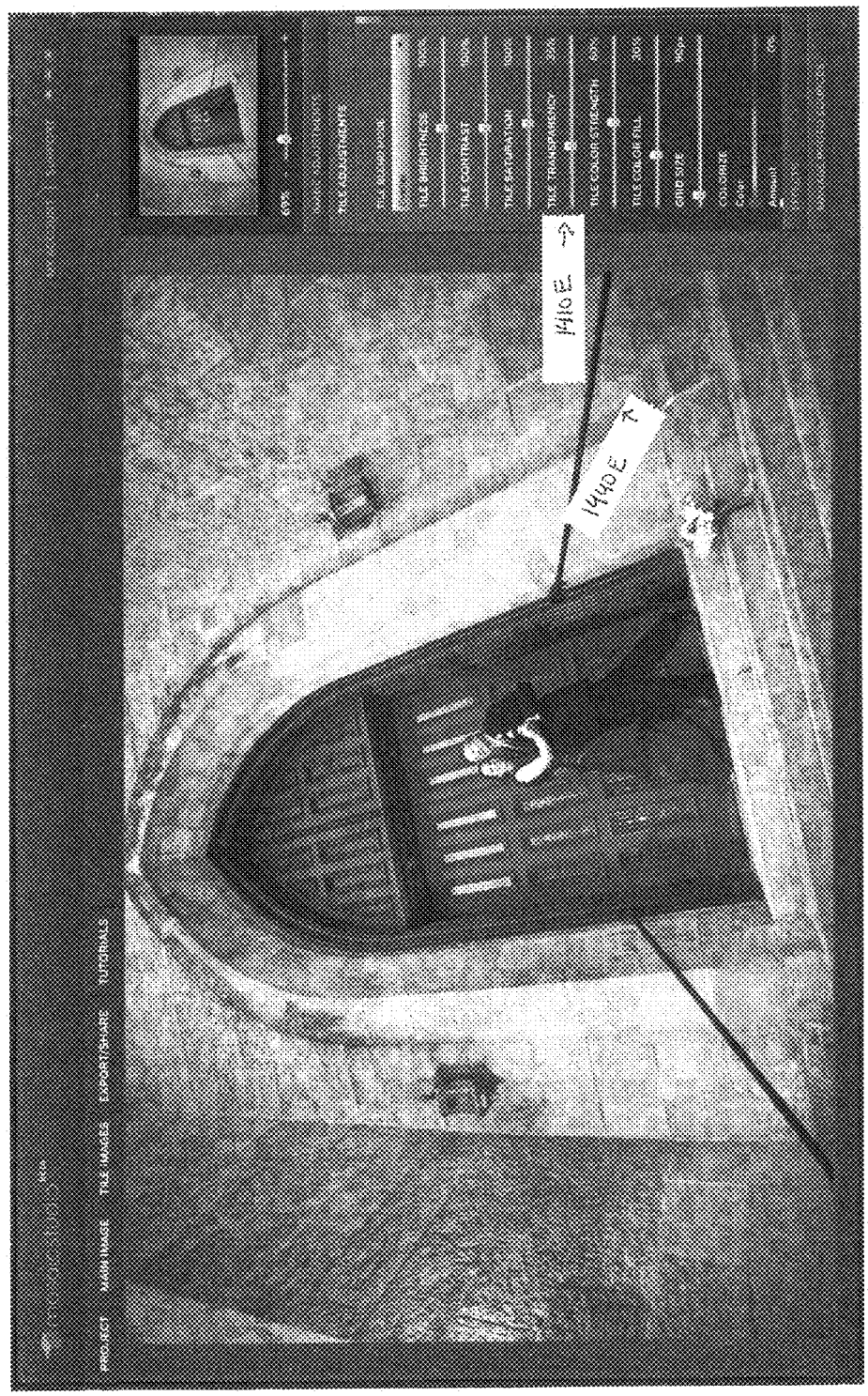

Fig. 16A

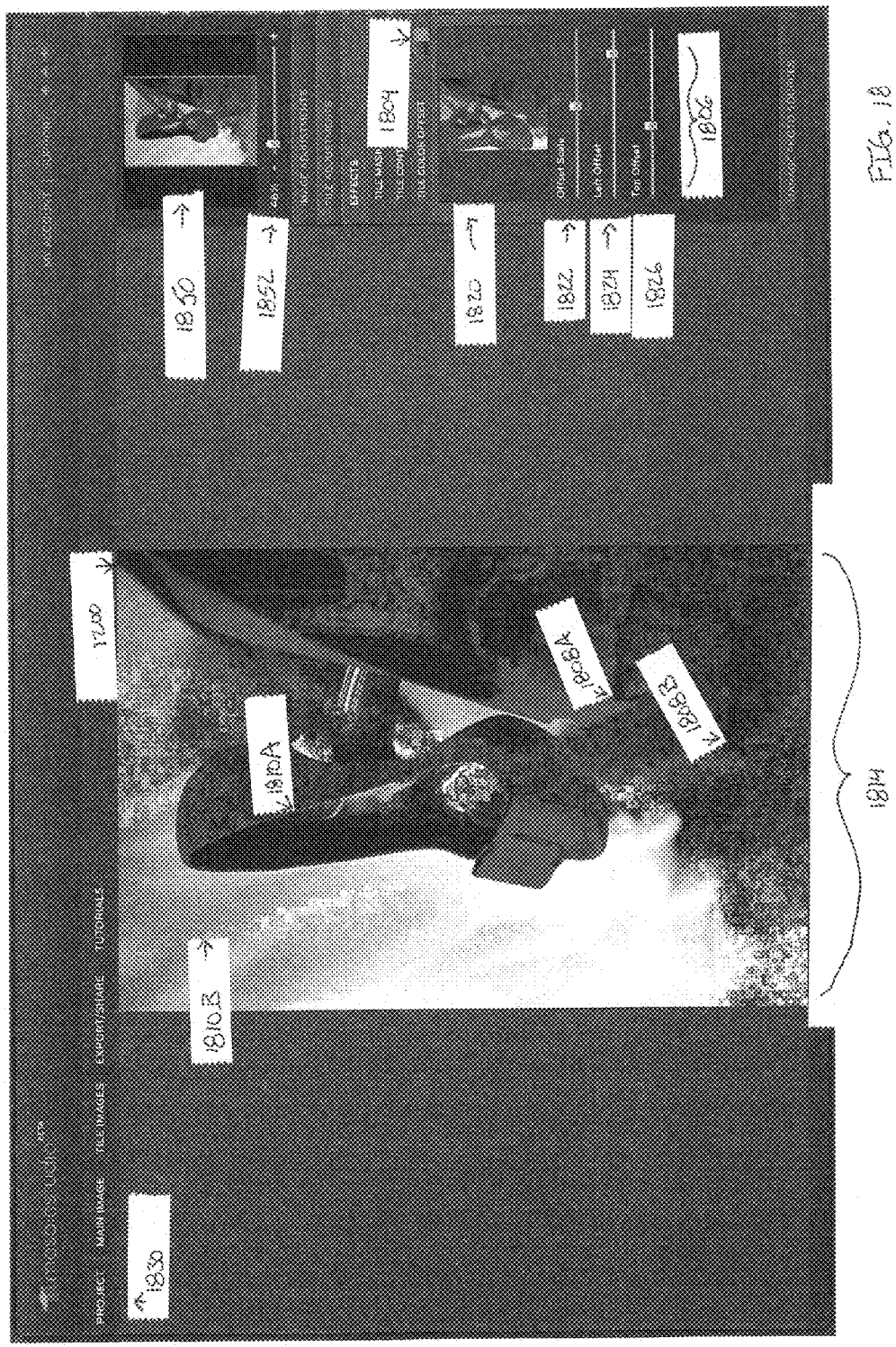

SYSTEMS AND METHODS FOR CREATING PHOTO COLLAGES

CROSS REFERENCE TO RELATED APPLICATIONS

This application is based upon and claims the benefit of priority from U.S. Provisional Patent Application No. 61/849,086, filed on Jan. 18, 2013, the entire contents of which are incorporated herein by reference.

FIELD OF THE INVENTION

The present disclosure relates to computer-based systems and methods for creating artistic image artwork. More particularly, the present disclosure relates to systems and methods for creating finished pieces that are comprised of a base image and a plurality of tile images, wherein a user has a great degree of freedom to control the look of the finished piece.

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

"Mosaics" or "collages" may generally describe artistic creations that include a number of images that may be used to create a larger image. Various software programs exist to create mosaic artwork, however the resulting mosaic may tend to look pixelated, choppy, distorted, and may even fail to suggest what the final image is intended to be. This may be the case because conventional software programs use complex, time-consuming algorithms to try to find matches between small images that are used to make up a larger image. For example, conventional software may try to find a small image to build a red object in the larger image. The software may find an image that has some red in it, but the image may also have some yellow, green, and blue in the image. Using the small red, yellow, green, and blue image to make up a red object in a larger picture, may generally result in the red object in the larger image appearing choppy or "pixelated". Conventional programs do not offer an artist or user access to features that may remedy these shortfalls. Furthermore, traditional software programs that include a rendering process may require rendering of the new image after every adjustment, whether the adjustment is a significant one or a minor one. Accordingly, the overall process for creating a final image may be prohibitively time-consuming and/or costly from an energy, computing, and/or work stand point.

Thus, there is a need in the art for efficient systems and methods for creating final mosaic images, whereby a user may enjoy a relatively great deal of control over the outcome of the finished product. There is also a need for systems and methods for creating final mosaic images that include a readily identifiable larger image.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a computer-implemented method for creating a final mosaic image. The method includes receiving a main image from a database of images. The method includes generating a grid overlay having one or more grid cells, the grid overlay being coupled with the main image such that one or more grid cells each include a portion of the main image to create one or more image cells. The method also includes determining a tint value for each of the one or more image cells. The method includes receiving one or more tile images from the database of images. The method positions one of the one or more tile images into each of the one or more image cells to create one or more tiled cells. The method includes assigning the tile image positioned in each of the tiled cells the tint value that was determined for the image cell that each of the tile images has been positioned in to create a polished image.

The method can also include receiving an image property value to be assigned to one or more of the tiled cells, wherein the image property value is for color amount and blend level.

In another embodiment, the method can include applying one or more effects to at least a portion of the polished image using an effects engine.

In some embodiments, a masking effect can be used, where the masking effect includes assigning a mask area to a portion of the polished image. The masking effect also includes adjusting a transparency value for one or more of the tile images positioned in cell images within the mask area.

In another embodiment, the tilt-shift filter may be included in the effects engine. The tilt-shift filter includes assigning a focus area to the polished image, to create an area inside of the focus area and an area outside of the focus area. The tilt-shift filter routine also includes blurring the area outside the focus area.

In another embodiment, the image property adjusting effect includes receiving the polished image and an input value for one or more image properties. The image property adjusting effect includes adjusting the input value for the one or more image properties to give a modified value. The image property adjusting effect includes assigning the modified value to the image property of a tile image. The image property adjusting effect includes regenerating the polished image based on the modified value.

The present disclosure, in one embodiment, relates to a computer-implemented method for creating a final mosaic image. The method includes selecting a base image from an image library database. The method includes selecting a grid overlay and the dimensions of the grid overlay; the grid overlay being coupled to the base image such that a portion of the base image is associated with each of the one or more grid cells to create a plurality of image cells and an overall image layer. The method includes selecting one or more tile images from the image library database, one of the one or more tile images being positioned into each of the image cells to create a plurality of tiled cells and an overall tile layer. The method also includes adjusting one or more image properties of the tile layer to create a finished image.

In one embodiment, the image properties include tint amount. The image properties can also include blend level. The image properties can also include color fill level.

In another embodiment, the method further includes adjusting the one or more image properties of the base layer.

In another embodiment, the method further includes an effects engine. The effects engine can include one or more routines capable of modifying image property values for all or part of an image. The image can include the base image, the tile image(s), or the polished image.

The present disclosure, in one embodiment, relates to a system for creating final mosaic images. The system includes one or more databases for storing a library of images. The system includes a computer-implemented image generating application that uses one or more of the images stored in the library to produce a final image. The image generating application includes a rough image engine that creates a base image layer, the base image layer being selected by a user from the library of images, and a tile image layer that is created from one or more tile images selected by the user from the library of images, wherein the base image layer and the tile image layer are coupled together one on top of the other. The image generating application includes a polishing engine that determines a tint value for a portion of the base image layer and applies that tint value to the one or more tile images couple with the portion of the base image to create a polished image.

In another embodiment, the system further includes an effects engine that adjusts one or more image properties of the polished image, wherein the one or more image properties includes fill color.

In another embodiment, the system further includes an effects engine that applies a mask to the polished image.

In another embodiment, the system further includes an effects engine that applies contouring to the polished image.

In another embodiment, the system further includes a product ordering engine, whereby a user can order a product that is comprised of the polished image.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 1A shows a base image for use with embodiments of the present disclosure;

FIG. 1B shows a gridded image in accordance with embodiments of the present disclosure.

FIG. 1C shows a tile imaged for placement in an image cell of a gridded image in accordance with an embodiment of the present disclosure.

FIG. 1D shows a tiled image in accordance with an embodiment of the present disclosure.

FIG. 1E shows a polished image in accordance with embodiments of the present disclosure.

FIG. 12B shows another tiled image in accordance with embodiments of the present disclosure.

FIG. 14 shows an image that includes the use of blending tools of the present disclosure according to some embodiments.

FIG. 14D-E shows the use of transparency tools to adjust image properties in accordance with some embodiments of the present disclosure.

FIG. 16A shows examples of different making effects that can be applied to an image, in accordance with some embodiments of the present disclosure.

FIG. 18 shows an image that has been adjusted using the tile color offset tool in accordance with embodiments of the present disclosure.

DETAILED DESCRIPTION

Figure 2:
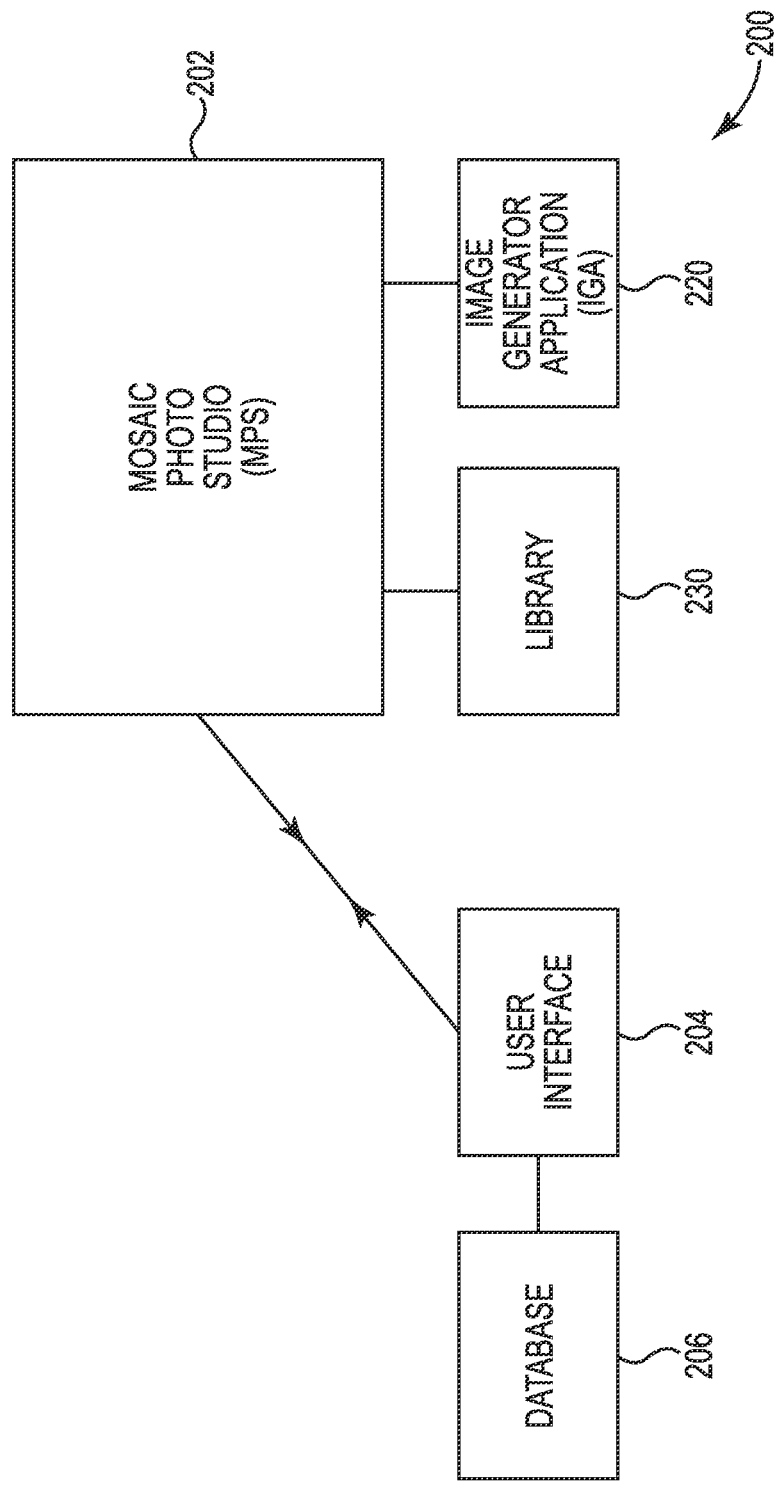
FIG. 2 is a system diagram according to some embodiments of the present disclosure.

The present disclosure relates to novel and advantageous systems and methods for creating photographic images. More particularly, embodiments of the present disclosure are directed to the creation of a final photographic image that is comprised of a base image and a plurality of tile images. A base image may have generally the same, or substantially the same dimensions as the final photographic image. The base image may, however, be divided into a plurality of cells, whereby each cell may include a tile image. Accordingly, the final photographic image comprises a frame-filling base image that is made up of a number of smaller images. For example, FIG. 1A shows a base image 102, where in this case, the base image 102 includes a tree 103. FIG. 1B shows the base image 102 with a grid 104 that has been laid over the base image 102 to create a plurality of individual cells 106, 108, 110. The base image 102 including the grid overlay 104 may be referred to as the gridded image 140. FIG. 1C shows a tile image 112 that may be set into cell 106 of the gridded image 140. A tile image 112 may be set into each cell of the gridded image 140 to form a tile image layer. As seen in FIG. 1D, the tile image layer 126 and the base image or base image layer 102 when combined form a rough image 150. One or more properties of one or more of the tile images 112, the tile image layer 126, the base image 102, and/or the rough image 150 may be adjusted, enhanced, or altered to form a polished image 160. An example of a polished image comprising an orchid base image 180 and tile images from a wedding 182, 184, 186 may be seen in FIG. 1E. For example, the tint and/or the blending of colors may be altered or adjusted so that the color of a particular tile image set in a particular cell of a gridded image may substantially comport with the color of the base image at that same location. In some embodiments additional changes or visual effects may be applied to the polished image to create a final or finished image.

The systems and methods of the present disclosure may be used to create final images of nearly infinite variety and artistry. For example, a final image may include a base image of a couple getting married, while the tile images may have been taken of the couple from the time they met up until the day of the wedding. Another example may include a final image showing a sports team logo comprised of tile images of all the players on the team. Still another example may be used to create a holiday card, whereby the base image is a family photo, and the tile images are of the individual members of the family.

The systems and methods of the present disclosure may be generally computer-based. As shown in FIG. 2, the system 200 in some embodiments may include a user interface 204 from which a user may access the Mosaic Photo Studio (MPS) 202. The MPS may include a library 230 of images stored in one or more databases; and an Image Generating Application (IGA) 220. In other embodiments other components may be included in the system. The MPS 202 may be configured to be suitable for use by one or more specific category of users. For example, in one embodiment, the MPS 202 may be configured for use by professional photographers who have a generally medium to high level of experience and skill using computer-based photographic programs. Other embodiments may be configured for novice users who may be generally unfamiliar with computer-based photographic programs. Still other embodiments may be configured for use by children or teenagers for example. The differences between the different versions of the MPS 202 may include, but are not limited to the number of engines or tools included in the Image Generation Application 220, and/or the complexity of the engines or tools.

User Interface

Figure 3:
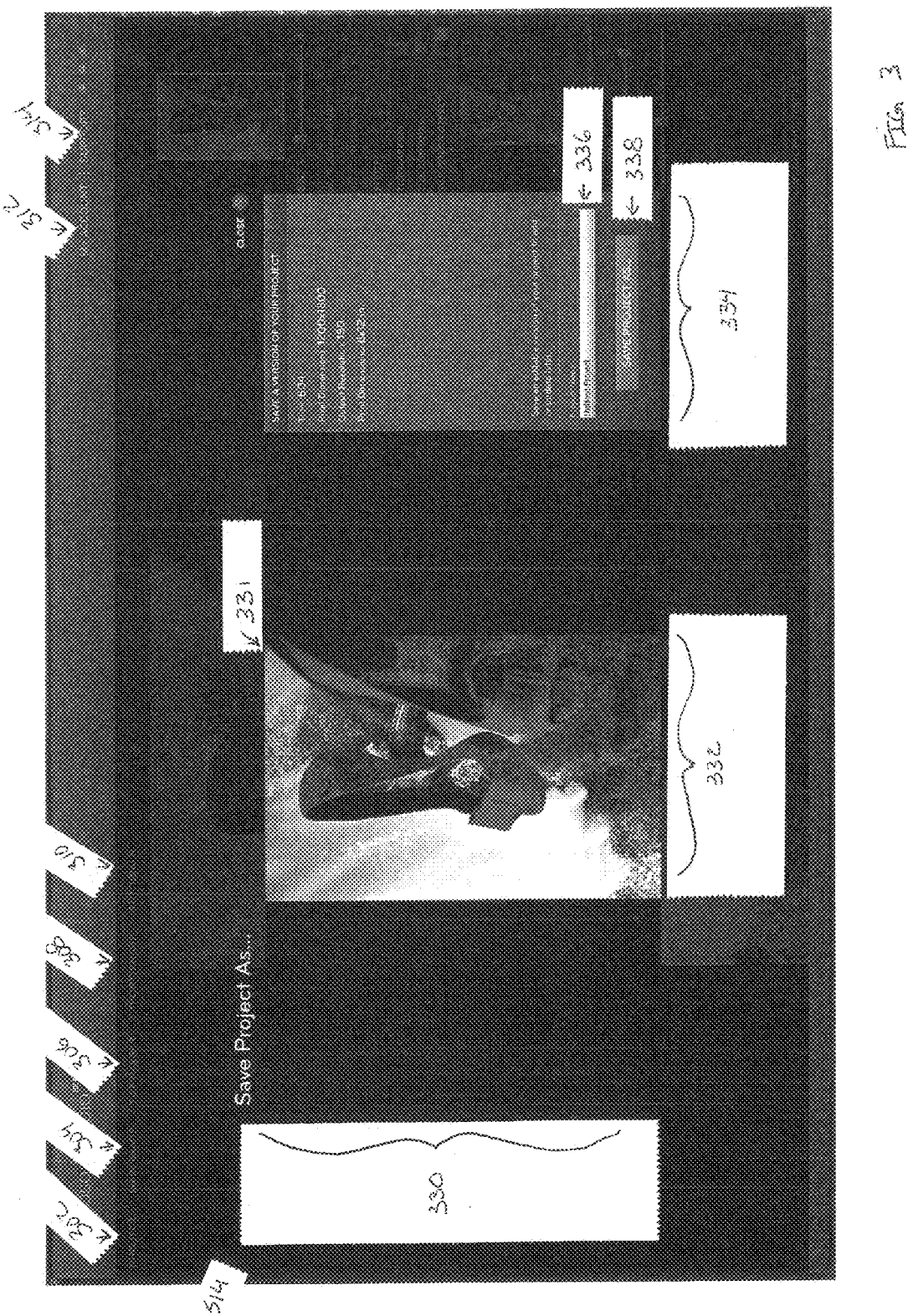
FIG. 3 illustrates a user interface according to embodiments of the present disclosure.

A user may access the MPS 202 via a user interface 204. The user interface 204 may be any standard or known type of computer-based user interface, for example, but not limited to a desktop computer, laptop, cell phone, PDA, or tablet. As is well known in the art, the user interface may include a number of one or more tabs, or pages, for example, for interacting with the MPS to create a finished mosaic image. As shown in FIG. 3, tabs or pages may include, but are not limited to, payment or my account 312, project creation 302, main image (image selection or library management) 304, tile images (image selection or library management) 306, save, export 308, tutorials 310, and support 314. In some embodiments, a page or link to a page for signing in and/or registering with the MPS 202 may also be included.

Registration

The first time a user attempts to access the MPS, the user may be asked to register with the system. The registration process may include collecting data from a user, including unique user data (such as passwords etc.) that may be used by the MPS to generate a unique membership, profile, or user account for example. Examples of the type of data that may be collected include but are not limited to, name, billing and shipping address, email, desired username, desired password, a fingerprint and/or a retinal scan. The registration process may also include collecting payment information, such as billing address, credit card number, checking account information, paypal account information, user payment preferences and/or any other relevant or suitable information. Payment information may be securely collected and/or stored.

Payment

Payment for products ordered via the MPS may be by any known or suitable means, including by credit card, check, paypal, or any other suitable means. In one embodiment of the present disclosure, a user may purchase one or more credits or tokens from the MPS. Purchases and charges may then be paid for through the use of the credits or tokens. For example, the system may charge the user one or more credits when a final mosaic image is saved or when it is exported, for example. A user may also be charged one or more credits if a user captures a "screen shot" of a final image or other image generated by the MPS, for example. A user may or may not be charged one or more credits for saving a project. In some cases, the system may automatically deduct credits or tokens for taking particular actions, such as taking a screen shot of an image. In other embodiments, the system may alert the user prior to executing an action that may be associated with payment to verify that the user wants to continue with the action.

In another embodiment, a user may pay to enter into a limited duration licensing agreement. For example, a user may agree to pay a flat fee that would allow the user to make an unlimited number of final mosaic images in a given time period, such as one year, for example.

In yet another embodiment, a user may buy a license that to use a particular version of the MPS software, for example. Accordingly, if a new version of the software becomes available, the user may need to obtain another license to use that version. Optionally, or additionally, a user may be able to use embodiments of the present disclosure without limitation on a single device, but may not be permitted to transfer or use the software on any other device. Any suitable licensing or payment system may be used.

Sign In

In some embodiments, a user may be prompted to sign in to the MPS before the user is granted access to the system. The user may be asked to provide information including, but not limited to, their first name, last name, email address, a username, and/or password, for example. The MPS may allow only an authenticated user to access the system and data associated with that user's information.

Project Creation

A user may begin or access a project in the MPS by selecting a "project" tab 302, as seen on FIG. 3 that may be available on one or more pages of the user interface. It will be understood that in some embodiments the "project" tab 302 may have a different but analogous name, such as "working file," or any other suitable name. A user may have the following options to select from under the "project" tab 302: new project, open project, save project, save mosaic, or export mosaic, for example. Each of these options is discussed in greater detail below. It will be understood that in other embodiments, additional, fewer, or different options may be available.

Saving a Project

A user may save a project in the system. Saving the project, as is well understood in the art, may save all changes or alterations made to a project up until the user saves it. A user may return to the project at a later date to continue working on it and/or finish the project. As seen in the embodiment shown in FIG. 3, when a user selects "save a project" a save project window 330 may appear. The save project window may include a preview window 332 which may show what the final mosaic image 331 may look like at the current stage of creation. A project information window 334 may also appear that may identify information about the current project including, but not limited to: tile count, composition height, composition width, main image path, library images, tile layout data, tile adjustment data, image adjustment data, image thumbnail, image effects data, tile effects data, masking data, contour data, pixel dimensions, output resolution, print dimensions, number distinct tile images used, time user has spent on mosaic, and project name. The project name may be displayed in an editable text window 336. The user may edit or change the project name via this window. The user may save the project by selecting "save project as . . . " 338. If the project name selected has been stored before, the system may prompt the user to ask whether they wish to overwrite the current file or cancel. In some embodiments, the project file may be saved with the *.mosaicpro file extension, while in other embodiments, the file may be given any other suitable file extension.

Saving the Final Mosaic Image

A user may save the save the final mosaic image. In one embodiment, a "save image" window similar to the "save project" window 330 shown in FIG. 3, would allow the user to preview the final mosaic image 331, edit the name to be given to the file, and/or save the final image. After selecting "save image", a new "save" window may appear on the screen. This "save" window may allow the user to elect to save the image as a .jpg image, .tif file, .png file, or any other suitable file format. The user may select where the file should be saved, for example, on a hard drive, flash memory drive device, cloud storage database, or any other suitable storage space. In other embodiments, a default setting may be selected, such that all files are saved to a particular place and/or in a particular way. For example, all files may be saved to the user's hard drive in a particular folder as a .jpg image. However, it will be understood that any suitable method to save the final mosaic image may be suitable.

Exporting the Final Mosaic Image. Consensus

Figure 4:
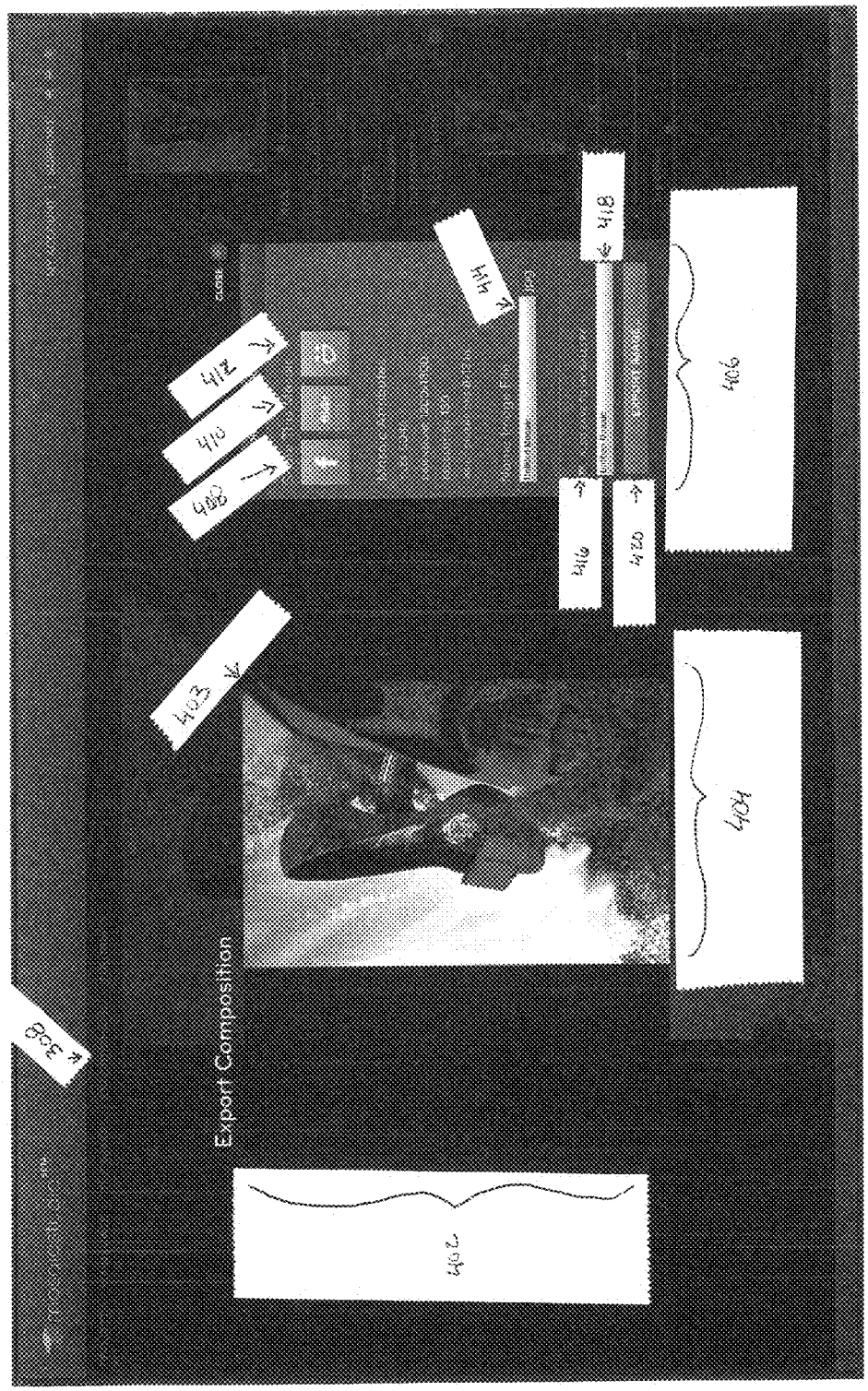
FIG. 4 is a screenshot of the user interface according to embodiments of the present disclosure.

As seen in FIG. 4, selecting export/share 308, may open an "export composition" window 402 that may contain a final mosaic image preview window 404 and an export or share window 406. The export or share window may include one more different pre-defined sites or sources to which a user may move or export a final image. For example, in some cases, the options may include one or more social media sites such as, but not limited to: Facebook 408, Flickr 410, SmugMug 412, Instagram, SnapChat or any other social media source. Export sources may also include email, instant message, text, google drive, or any other suitable application, program, or communication method. One or more export sources may be selected. In some embodiments, when an export source is selected a user may have the option to name, or change the name of the file to be exported via an editable text box 414, which will be uploaded or exported with the final mosaic image 403. A user may save the image to a hard drive or device's image gallery by selecting a box 416. A user may enter a new or different name for a project or file in a text field 418 of a save box 416. Selecting "export" or "export image" 420 may connect the system with the export or share methods selected, and send the image to each source selected. If multiple sources were selected the system may open sequential preview and text editing windows, which may allow a user to individualize the final mosaic image file for each export source. For example, if Facebook and email were both selected, the system may open up a Facebook export window allowing a user to write a post, tag one or more friends, and/or share or use the image in any other suitable or known way. Next, the system may open user's email program such that the user may attach the image to an email for sending. Any suitable method for exporting or sharing images created by the system may be used.

Mosaic Photo Studio

Library

The image library may comprise a database for storing one or more digital images. In some cases, a user may provide the images in the library, while in other cases, the library may, or may also comprise standard, stock, or canned images provided by the MPS. The library may reside on the user's hard drive, on a disc drive, flash drive, digital camera, in the cloud, or on a server controlled by the MPS, or any other suitable place, or combination of places, for example. If a user wishes to include an image in the library, a user may upload the image from any known source, such as the user's hard drive, a digital camera, a cell phone, from one or more social media sources or other websites, or any other suitable device or source. In some embodiments, a user may create folders to organize photos by subject matter, date, color or category for example, in order to make image selection easier when using the Image Generator Application. A user may select one or more base images, also referred to as main images, from the library. A user may also select one or more tile images from the library. In one embodiment a library may be generated from which to select both the main images and tile images. In other embodiments, a library for base images and a separate library for tile images may be created.

Figure 5:
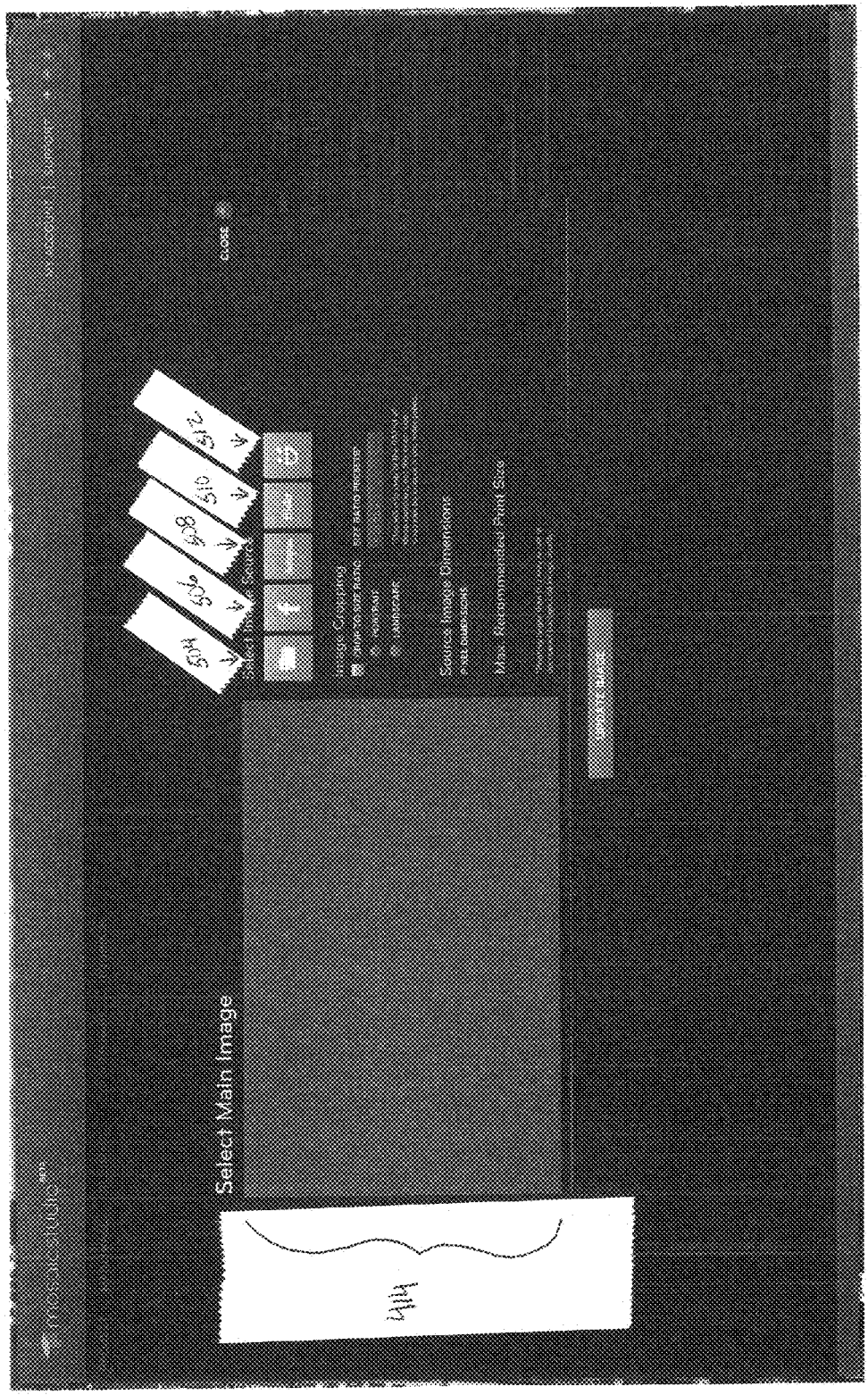
FIG. 5 is a screenshot of the user interface for manipulating a base image according to some embodiments of the present disclosure.

In one embodiment, the user may browse through potential images sources for a base image. For example as seen in FIG. 5, a user may select the hard drive option 504. In response to the selection, the system may open an OS-native file browsing window where the user may select one or more images at a time, as is well known in the art. The user may select which image(s) to use as a base image and click "open" from the native file browsing window. A user may select another image source, for example Facebook 506. The system may make a call to Facebook and obtain any necessary permission or authorization to access one or more images and/or albums. The user may scroll through albums and images contained on Facebook servers and select one or more images for use with the systems and methods of the present disclosure. In a similar manner, one or more other sources may be selected to provide images for use in the MPS, including, for example the following sources, Instagram 508, Flickr 510, SmugMug 512, or any other potential source present in other embodiments. The image(s) selected from a source appear in a viewing and editing window 514. It will be understood that any suitable method for selecting a base image may be used.

Figure 6:
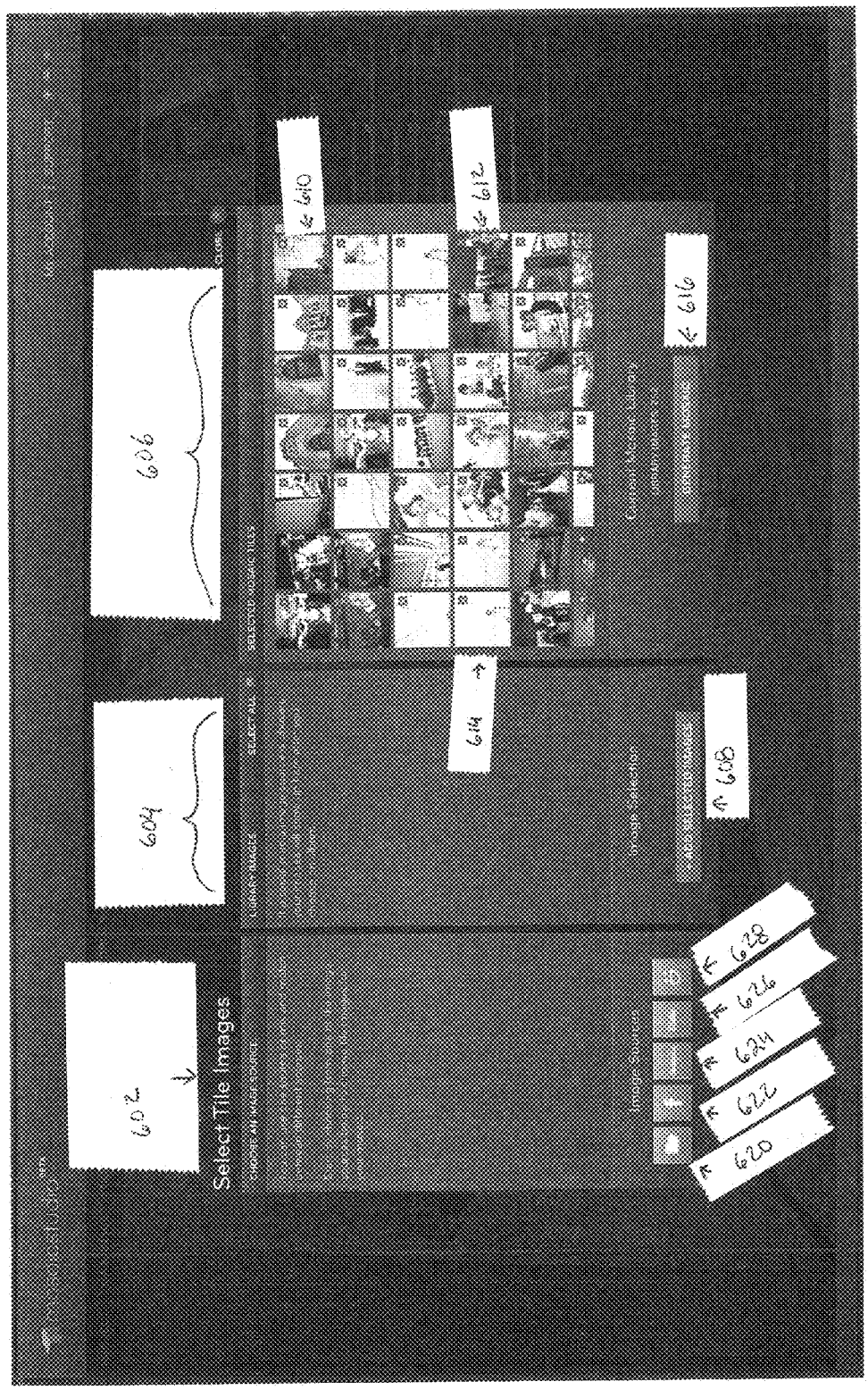
FIG. 6 is a screenshot of the user interface for manipulating tile images in accordance with some embodiments of the present disclosure.

In one embodiment, as seen in FIG. 6, a user may be able to upload and/or import tile images for use in the MPS. The user may select one or more sources (a user hard drive 620, Facebook 622, Instagram 624, Flickr 626, SmugMug 628, or any other suitable source) from which to upload or import images for the image library. Once a user has added tile images to the library, the tile images 610, 612, 614 may be displayed within the library images window 604. In another embodiment, the images be organized in a list and include a file name associated with each image. However, any method of organizing library images may be used.

From the library images window 604, the user may select one or more images for use in the MPS. In one embodiment, the selected image may be highlighted in a bright color. In another embodiment a user may select images by checking a box associated with a particular photo or image. In still another embodiment, a user may click and drag the image from the library images window 604 into the selected mosaic tiles window 606. After a user selects "+ add selected images" 608 the system may add small icons of the images into the selected mosaic tiles window 606. Any method for selecting one or more images in the library is contemplated and within the scope of the present disclosure.

Figure 6A:
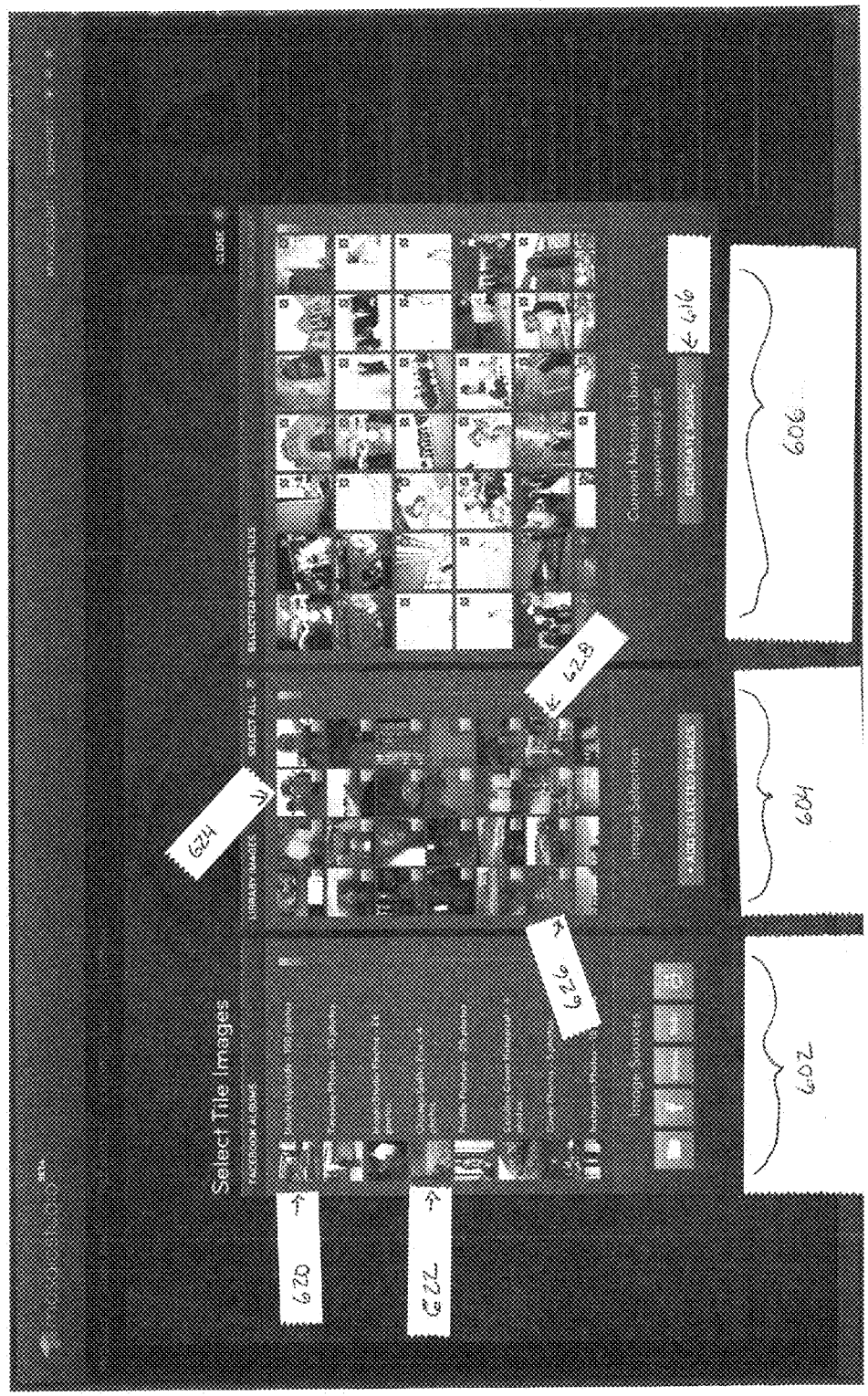
FIG. 6A is another screenshot of the user interface for manipulating tile images in accordance with some embodiments of the present disclosure.

FIG. 6A shows an embodiment of a user interface that allows a user to import images or albums from Facebook. If an image source has access to multiple albums, like Facebook, the system may display all albums 620, 622 in the tile image source window 602. By selecting an album, the album images 624, 626, 628 may be displayed in the library images window 604. In some embodiments, the library images window 604 may clear the previously selected source's images allowing the user to only view images from the currently selected source. In other embodiments, the new source's images may be added into the already existing library allowing the user to see all potential tile images available from the selected sources.

Once the user has selected one or more base images and one or more tile images, they may access the image generator application (IGA). As seen in FIG. 6A, the IGA may be accessed by selecting "Generate Mosaic" 616. Any suitable method to access the IGA may be used.

The Image Generator Application (IGA)

Figure 7:
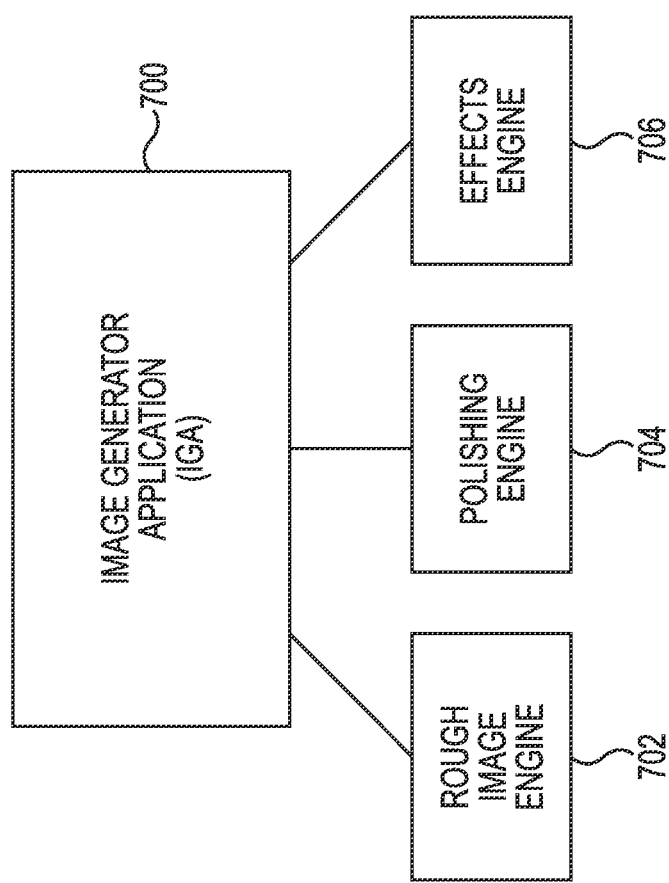
FIG. 7 is a block diagram showing the engines associated with the Image Generator Application, in accordance with embodiments of the present disclosure.

The Image Generator Application (IGA) of the Mosaic Photo Studio may be used to manipulate the base and tile images to create a pleasing, and artistic finished image. As seen in FIG. 7, the IGA 700 may be comprised of one or more engines (also referred to interchangeably herein as tools or routines) for manipulating the images comprising the finished image. The IGA 700 may, for example, in some embodiments include the following engines: a rough image engine (RIE) 702 (that may layer the main image and tile images), a polishing engine 704 (that may transpose base image properties onto the tile images), and an effects engine 706 (that may apply image adjustments and effects to one or more layers of the polished image). However, it will be understood that some embodiments may be comprised of more, less, or different engines.

The Rough Image Engine

Figure 8:
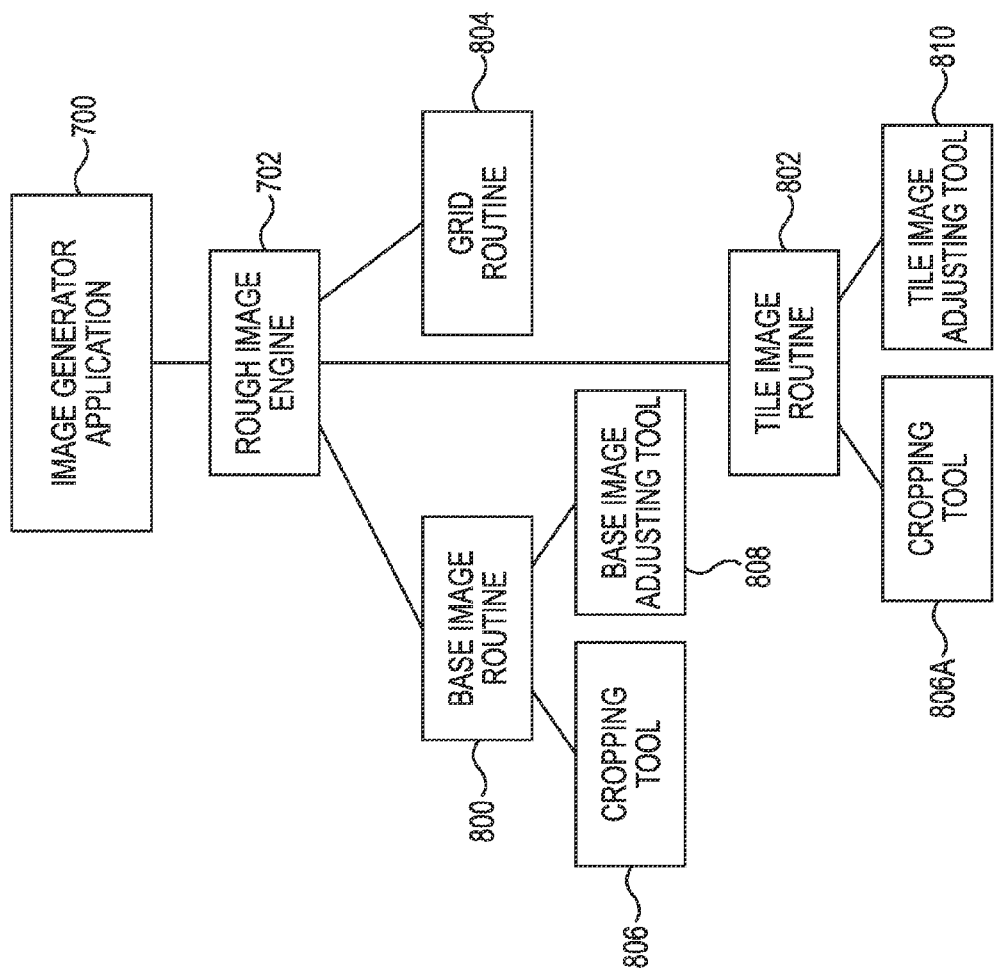
FIG. 8 is a block diagram showing the components of the rough image engine according to some embodiments of the present disclosure.

The Rough Image Engine (RIE) 702 may be used to create a rough image or basic mosaic. The Rough Image Engine 702 may create a rough image that may include: a base image, the grid overlay, and the individual tile images positioned in the cells of the gridded image. In some embodiments, the RIE 702 may be comprised of one or more routines for constructing the basic mosaic. For example, as seen in FIG. 8, the RIE 702 may include the following routines: a base image routine 800, a tile image routine 802, and a grid routine 804.

The Base Image Routine

The base image routine 800 may include one or more features or functions for manipulating a user selected base or main image. A user may select a main image from the library. A user may select one image to be designated the base or main image, or a user may select two or more images that may be combined to form a single main image. For example, a user may create a final image comprised of a base image that is a single image, such as a sunset on a beach. A user may create another final image that includes a base image comprising two side by side images, such as a father crossing a finish line and a son crossing the finish line of the same race ten years later. Yet another embodiment may include a base image that is itself comprised of three or more images.

Figure 9:
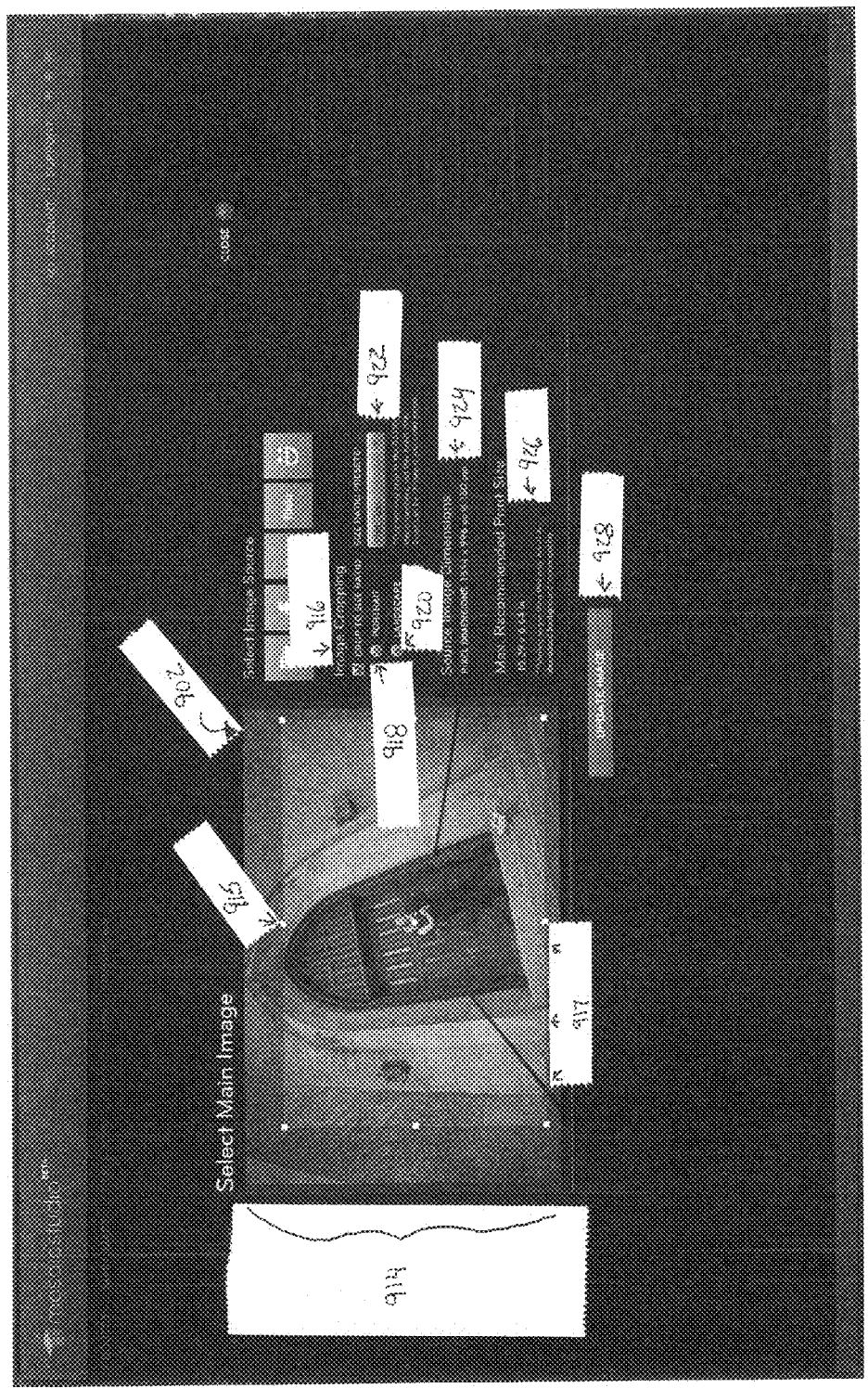
FIG. 9 is a screenshot of the user interface showing the cropping tool according to some embodiments.

As seen in FIG. 9, the base image routine 800 may load the image into the system and display the base image 902 in an editing and viewing window 914. In some embodiments, the base image routine 800 may include a conversion of the base image, such that the image is formatted in a desired way. For example, in some embodiments images may be accepted in or converted to bitmap data. In other embodiments, images may be converted to another format. The user may edit or modify the selected base image using one or more tools included in the base image routine 800. Base image tools may include, but are not limited to, a cropping tool and base image adjusting tools.

The Cropping Tool

As seen in FIG. 9, a base image that has been selected may be displayed in the viewing and editing window 914. A cropping tool 916 may be selected. A crop rectangle 917 may appear on top of the image 902, whereby the cropping tool may be adjustable 915. The user may choose portrait 918 or landscape 920 layout orientations for the selected base image, which may respectively change the layout orientation of the crop rectangle 917. In another embodiment, a user may be able to change the dimensions of the crop rectangle. A size ratio presets drop down bar 922 may allow users to crop to varying preset ratios. Source image dimensions 924, including pixel dimensions may be displayed. A maximum print size 926 may also be displayed which may show the largest print that may be printed without decreasing the quality of the final image. The user, after positioning the crop rectangle 917 over the portion of the image to be used, may elect to crop the image as indicated. In one embodiment, the user may select a box, which may be labeled "crop," which would crop the image, causing the new cropped image to fill the entire viewing and editing window 914. In another embodiment, the user may select "next" or "update image" 928 to continue with the methods of the present disclosure.

Base Image Adjusting Tools

Figure 10:
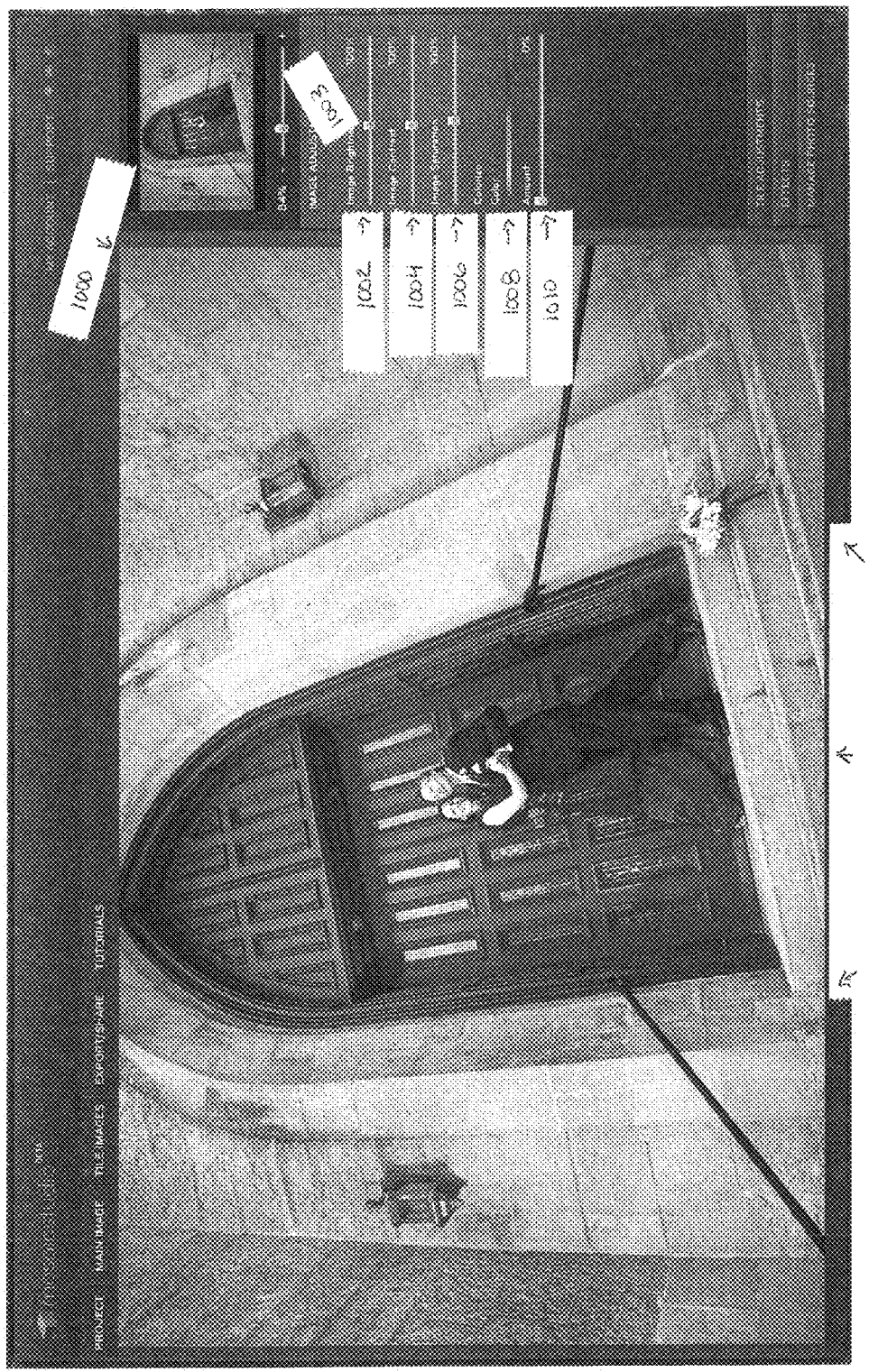
FIG. 10 is a screenshot of the user interface showing image adjusting options according to some embodiments of the present disclosure.

In one embodiment, as seen in FIG. 10, the new display may show a relatively larger viewing and editing window 1014, which may display the newly cropped base image 1000. A user may make image adjustments to the base image by using control tools to change one or more image properties including, but not limited to, image brightness 1002, image contrast 1004, image saturation 1006, color 1008, and color amount 1010. In one embodiment, a user may alter the value for one or more of these properties by moving a marker 1003 along a sliding scale. Other embodiments may change the value of these properties by allowing a user to spin a wheel or dial that includes different values, or by allowing a user to simply enter the desired value in a text box. It is understood that any method to alter the value for one or more image property may be used. An image tool may be used to change the value of one or more image properties in one region of the base image, in multiple selected portions of a base image, or the change may be applied to the entirety of the base image as desired by the user. For example, if the user moves the marker 603 on the horizontal line associated with image brightness 1002 to the far left the system may darken the image until the base image is substantially blackened. If the user then slides the marker along the same line to the far right, the base image may slowly lighten until the image is substantially whitened. These methods are examples of how a user may use these tools and are not meant to be exhaustive, any method which would allow the user to change image properties of the base image may be used.

The Tile Image Routine

The Tile Image Routine 802 of the Rough Image Engine 702 may load the one or more tile images that a user may have selected from the library. As with the Base Image Routine, the Tile Image Routine may include conversion functionality, such that the one or more tile images may be converted to a desired format for use in the system. For example, in one embodiment, the images may be converted to bitmap data. In other embodiments, the images may be converted to any desired format. The selected tile images may be displayed in an editing and viewing panel. The user may edit one or more of the tile images using one or more tile image tools. As seen in FIG. 8, tile image tools may include, but are not limited to, a cropping tool 806A (which functions generally similarly to the cropping tool discussed above) and tile image adjusting tools 810.

The tile image adjusting tools may adjust various image properties for one or more tile images. A user may select one tile image, the entire tile image layer (discussed below), or a region of tiles for editing.

The Grid Routine

Figure 11:
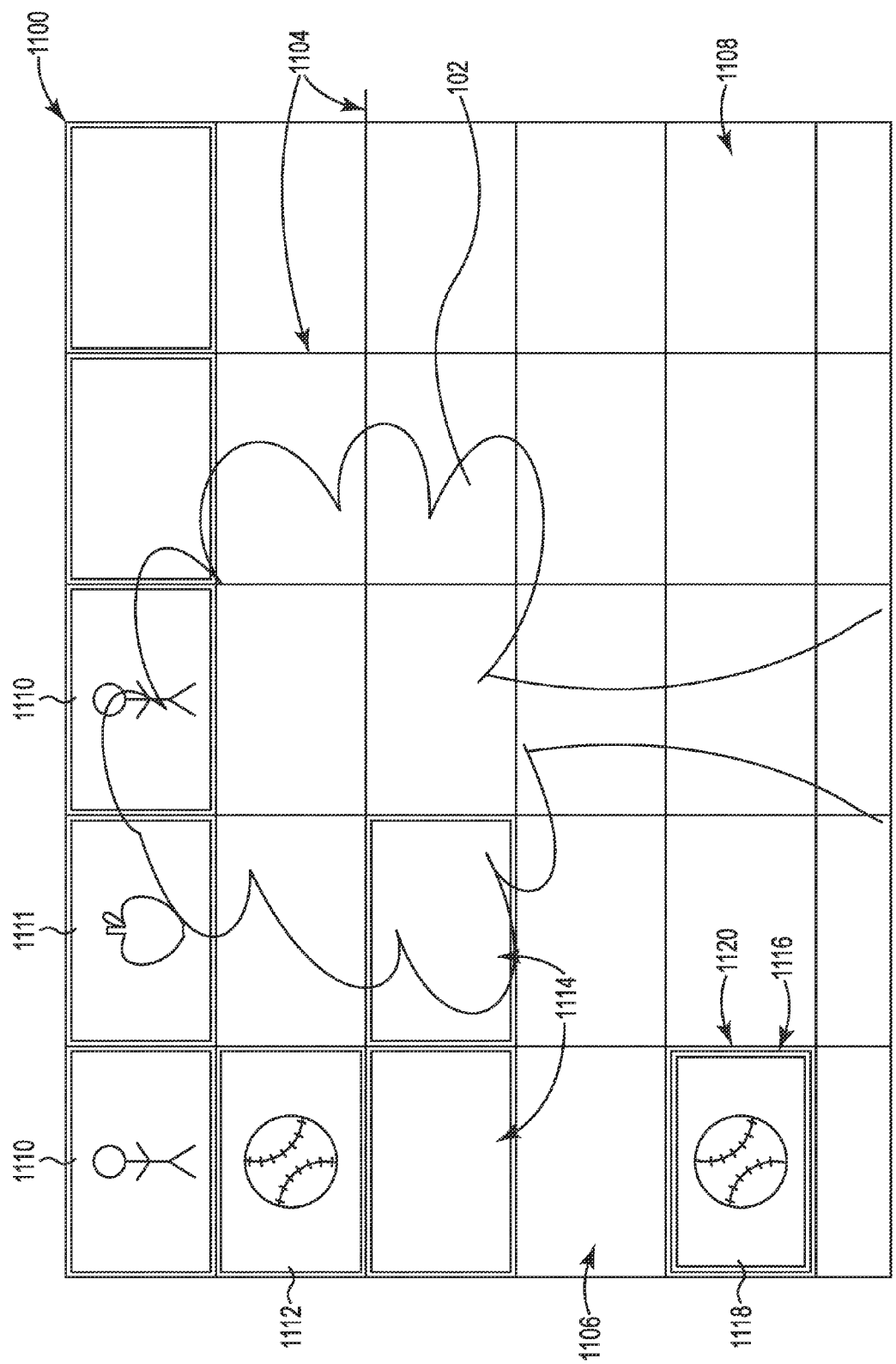
FIG. 11 shows a base image with a grid applied and tile images being placed into the image cells according to some embodiments of the present disclosure.

The Grid Routine 804 may construct a grid for coupling with the base image. The grid may be composed of any number of one or more rows and any number of one or more columns, creating one or more cells 1106, 1108, 1120, as shown in FIG. 11. When the grid is laid over, or otherwise coupled to the base image 102 to form a gridded image, the grid may divide the base image into cell image portions 1114, 1116 corresponding to the dimensions of the cells of the grid. A tile image 1118 may be set into each cell so that the tile image 1118 and cell image 1116 share the same cell 1120 within the grid. A tile image 1110, 1111, 1112 may be set into each cell in the grid.

In one embodiment, the tile images may be automatically placed into cells by the system. The automatic distribution may be random, or ordered in any reasonable way. For example, an algorithm may be used to ensure that to the extent possible, the same tile image is not placed in adjoining cells, for example. Any other ordering system may also be used to automatically arrange tile placement. In one embodiment, the system may automatically place tile images into cells, but the user may move, or replace individual tile images to their liking. The number of images selected as tile images may be controlled by the user. The user may select only one tile image, such that that tile image is the only tile image use and is placed in every cell of the gridded image. The user may select two or more tile images that may be used to populate the cells of the gridded image. The tile image may or may not be the same as the base image.

Figure 12A:
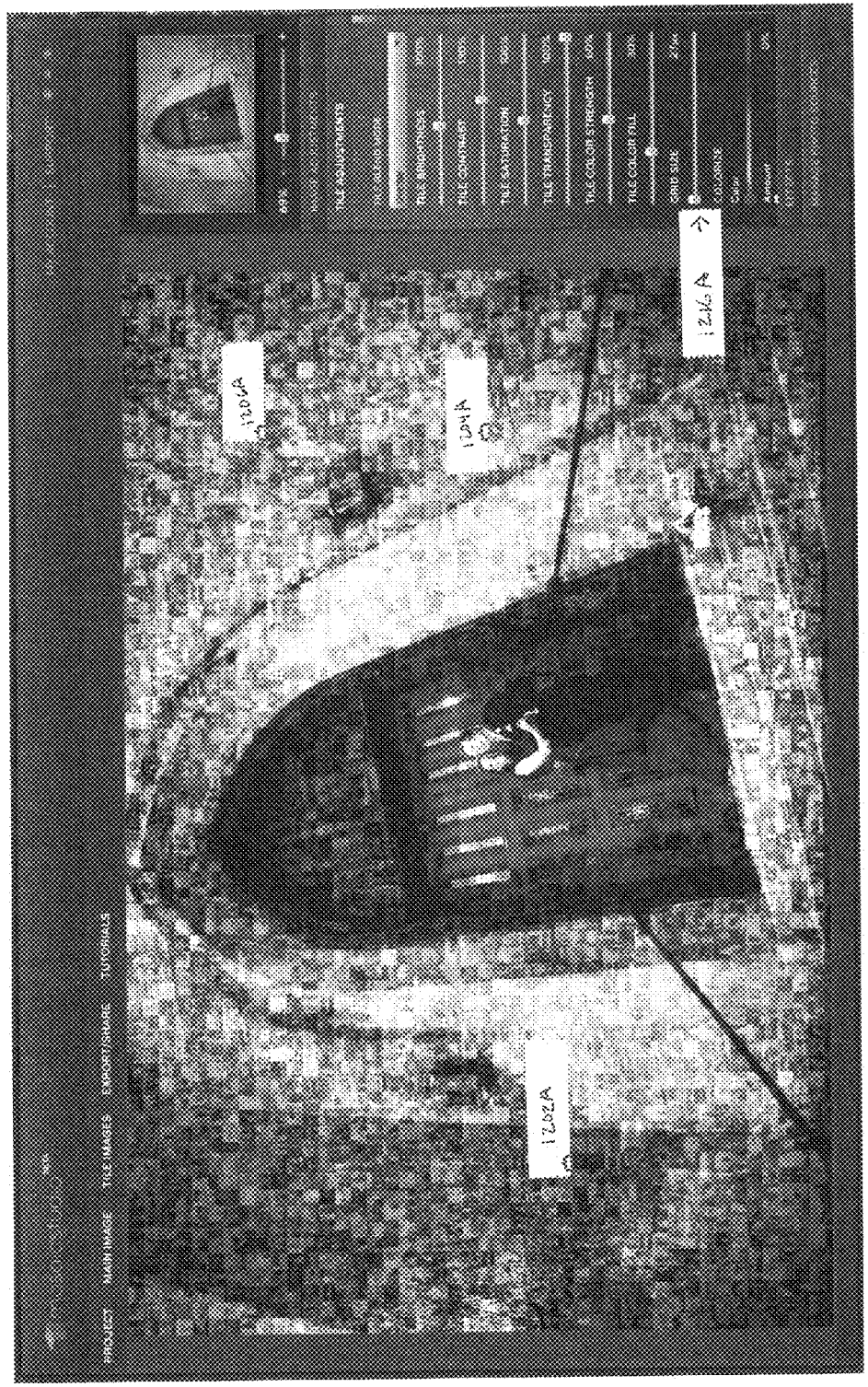
FIG. 12A shows a tiled image in accordance with embodiments of the present disclosure.

The dimensions of the grid overlay may be adjustable. As shown in FIG. 12A, a grid size 1216A, set to a low value may cause the system to create a grid with a relatively large number of rows and/or columns (as selected by the user), resulting in a gridded image containing a relatively large number of small cells. Gridded images comprising small cells will naturally result in the tile images placed in each small cell to be small, as seen with tile images 1202A, 1204A, and 1206A. Conversely, as seen in FIG. 12B, a grid size 1216B value set to a high value may cause the grid to have fewer rows and fewer columns and thus relatively larger cells. This may cause the tile images occupying the cells to be relatively large, as seen with tile images marked 1208B, 1210B, and 1212B.

The base image may comprise a single layer, while all of the tile images together may comprise a separate and distinct tile image layer. The base image and tile image layers may be adjusted for image properties individually in some embodiments, or in conjunction with each other in another embodiment. For example, in the former embodiment adjusting the brightness of the tile image layer may not adjust the brightness of the base image. However, in the later embodiment, any adjustment of brightness may effect both the base image and the tile image layer.

The Polishing Engine

Figure 13:
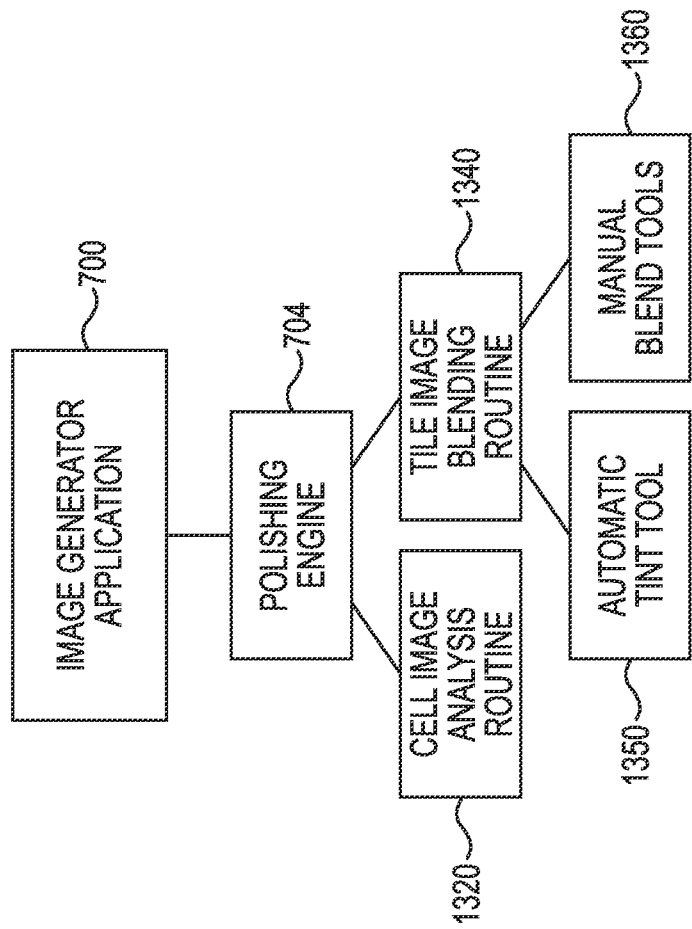
FIG. 13 is a block diagram showing the components of the polishing engine according to some embodiments of the present disclosure.

One of the many advantages of the IGA of the present disclosure is the ability to create a final image that allows a viewer to easily see the base image. The polishing engine adjusts the properties of the tile images to allow the base image to be easily seen in the final product. Some or all of these properties may be adjusted by the user to one degree or another. The polishing engine 704 may be comprised of one or more routines. For example, as seen in FIG. 13, the polishing engine 704 may be comprised of a cell image analysis routine 1320 and a tile image blending routine 1340.

The Cell Image Analysis Routine

The Cell Image Analysis Routine may determine various image properties from the base image for each cell of a gridded image. A cell image (discussed above) may be analyzed for various image properties, including color. This analysis may be herein referred to as a cell image analysis. A cell image analysis may be performed on each of the cell images. In one embodiment, the cell image analysis may include finding a pixel at or near the center of the cell image and determining the color tint of that pixel. It will be understood that in other embodiments, the analysis may include two or more pixels located at a user specified location of a cell image. This method of determining the tint of a cell image may advantageously be performed with relatively little computing power and may be accomplished in a relatively small amount of time. Other conventional software may perform cumbersome and inefficient analyses of image properties in an effort to match tile images to a portion of the base image. For example, one known technique includes taking a portion of a base image and finding an average tint value for all of the pixels in the base image portion. The algorithm then looks for tile images available that most closely match that averaged tint value. In some cases, the software will also find an average tint value for each of the tile images. Performing this type of analysis takes a great deal of time and or computing power. In contrast, the analysis performed by the cell image analysis routine 1320 of the present disclosure may be performed generally quickly and easily.

The Tile Image Blending Routine

The Tile Image Blending Routine 1340 may be comprised of an automatic tint tool 1350 and a variety of manual blend tools 1360 in some embodiments.

The Automatic Tint Tool

The automatic tint tool 13530 may automatically adjust various image properties of the tile images, that may create a pleasing and artistic finished image. The cell image analysis performed on a cell image may be used to adjust various image properties of a tile image placed in the same cell. The tint value of a tile image may be adjusted to match the tint value of the selected pixel(s) from the cell image determined by the cell image analysis routine 1320. For example, the cell image analysis routine 1320 may determine that the selected pixel(s) of a cell image may have a tint value in the blue spectrum (imagine a portion of an image of the sky filled the cell), the tile image placed in that cell may be tinted to have that same value, i.e. blue. If the tile image selected to occupy that particular gridded cell was an image of an apple, the picture, including the apple would be tinted blue. The apple's shape in the image may still be recognizable to an observer, but the apple, along with the rest of the tile image, may now match the blue tint of the sky in the base image.

The tint amount may also be adjustable in some embodiments. Accordingly, if a high tint amount is selected, the color may appear relatively bold, whereas if a low tint amount is selected, the color may appear relatively washed out or light. In some embodiments, the tint amount may be set to a default, for example 60% which may tint the tile images but still allow for some of the tile image's original colors to be seen. Though it will be understood that a default value could be any desired value. In some embodiments, each tile image placed in a gridded image cell is subjected to the process of tinting performed by the automatic tinting tool 1350. In other embodiments, a user may select certain portions of the gridded image and/or portions that may not be automatically subjected to the process performed by the automatic tinting tool 1350.

The Manual Blend Tools

As seen in FIG. 14, the Tile Image Blending Routine 1340 may be comprised of one or more manual blend tools 1360. A user may use these tools manually after the tint has been applied to the tile images in order to better blend the base image and tile image layer, as desired. In some embodiments the user may use one or more tools to change one or more of the image properties of the individual tiles, or for the tile image layer as a whole, for example. These tools may include, but are not limited to: tile blend mode 1402, tile brightness 1404, contrast 1406, saturation 1408, transparency 1410, color strength 1412, color fill 1414, color/tint 1418, and/or color amount 1420.

A user may change the tint amount 1420 (discussed above) to get the desired effect. In one embodiment the user may be able to change the color/tint 1418 of the tile image layer. In some embodiments the user may be able to change the tint amount 1420 of individual tiles or the tile image layer as a whole. Preset values may be provided by the system in some embodiments to enable a user to quickly change the tint and tint amount of the base image, the tile image layer, or both to achieve a particular overall look for example. By way of example, image properties may have selectable preset values to achieve the following looks: sepia, cartoon, soft pastel, muted skin tone, vivid blue, black and white, or any other look. In some embodiments, a user may choose to undo, or adjust the image properties from the preset values, which may return the image to the state it was in prior to selecting a preset.

The user may make changes to tile properties in order to blend the tile image layer and base image in various ways. Different tile blend modes 1402 may cause the tile image color to blend with the base image color to produce a different outcome. A user may click on a drop down box 1403, or any other suitable method to display and select different options for changing the tile blend mode. Other tile blend mode options may include, but are not limited to: normal, hard light, and screen.

Different blend modes may, depending on the project, produce very different results. The "normal" tile blend mode illustrated in FIG. 14A, may generally include edit or paint each pixel of the tile image in order to make the average of the pixel colors match the value of the tint determined through the cell image analysis. The "hard light" tile blend mode illustrated in FIG. 14B may multiply or screen the blend color. Thus, if the blend color (the combination of the tile image and underlying base image tint) is lighter than 50% grey, the image may be lightened. This may be useful to add highlights to an image. If the blend color is darker than 50% grey, the image may be darkened. This may be useful to add shadows to an image. The "screen" tile blend mode illustrated in FIG. 14C may include multiplying the values of the blend color. This may result in the final image having a relatively lighter overall color.

Figure 14A:
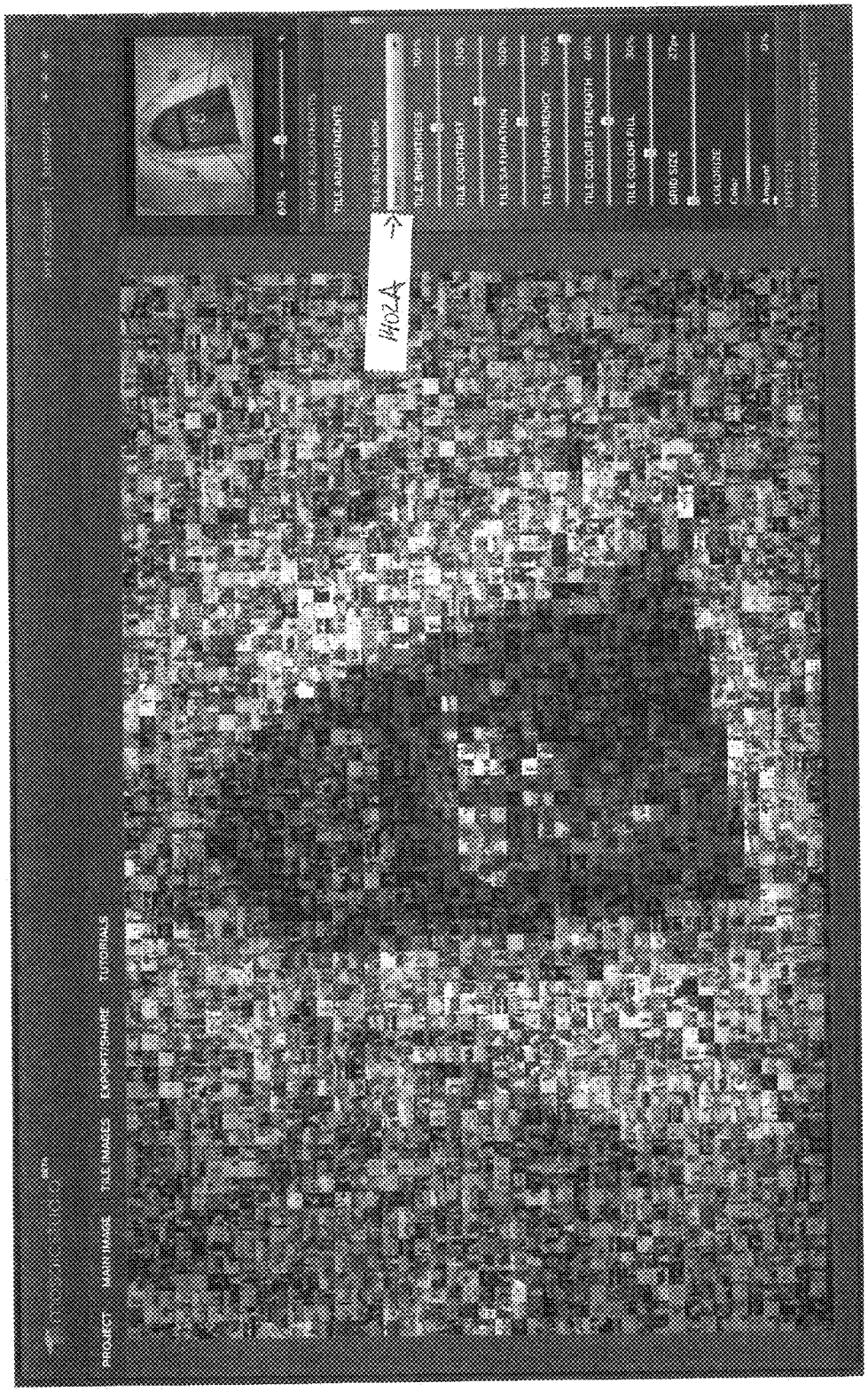
FIGS. 14A-C show images that have had blending adjustments made to the images in accordance with embodiments of the present disclosure.
Figure 14B:
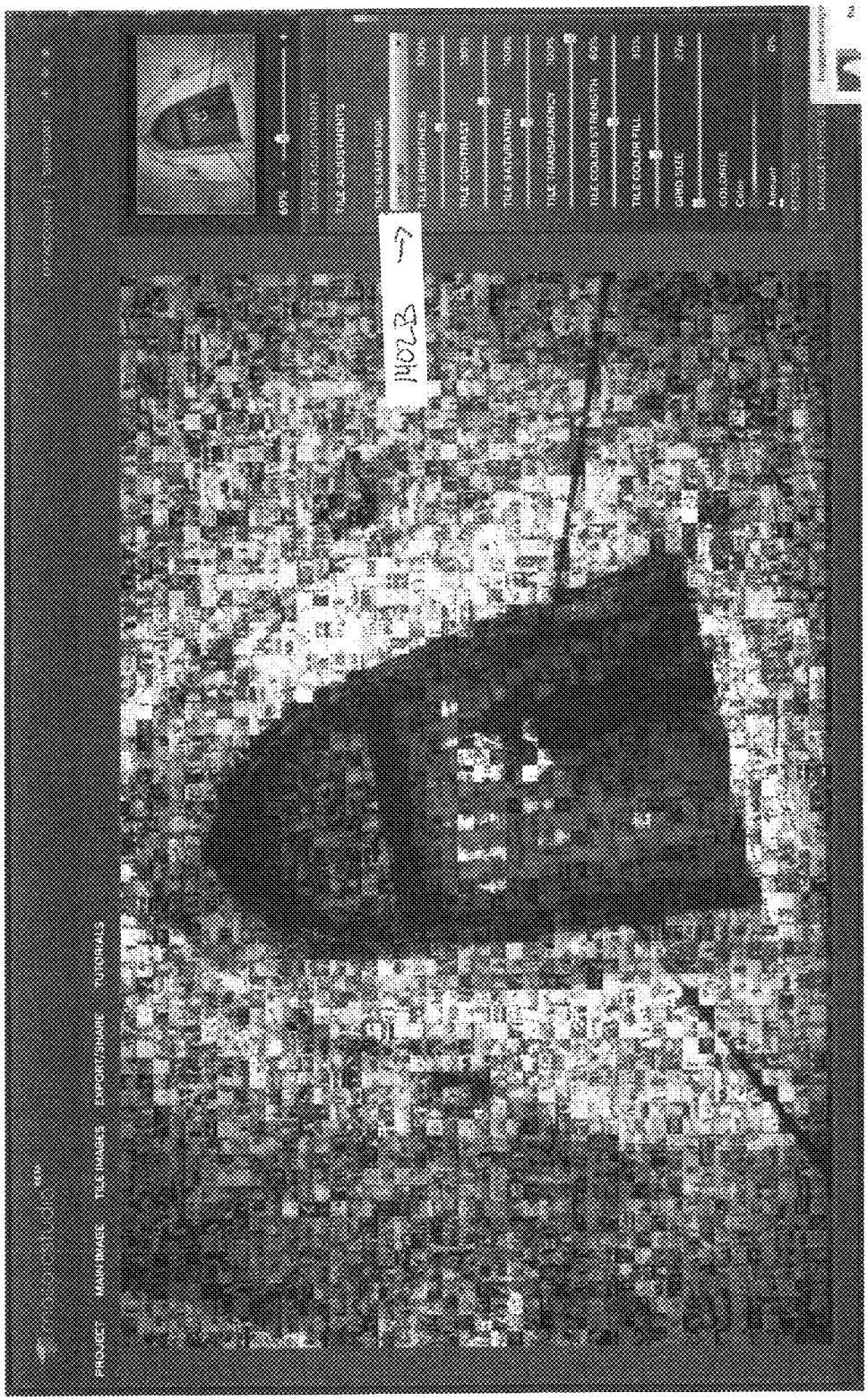
Figure 14C:
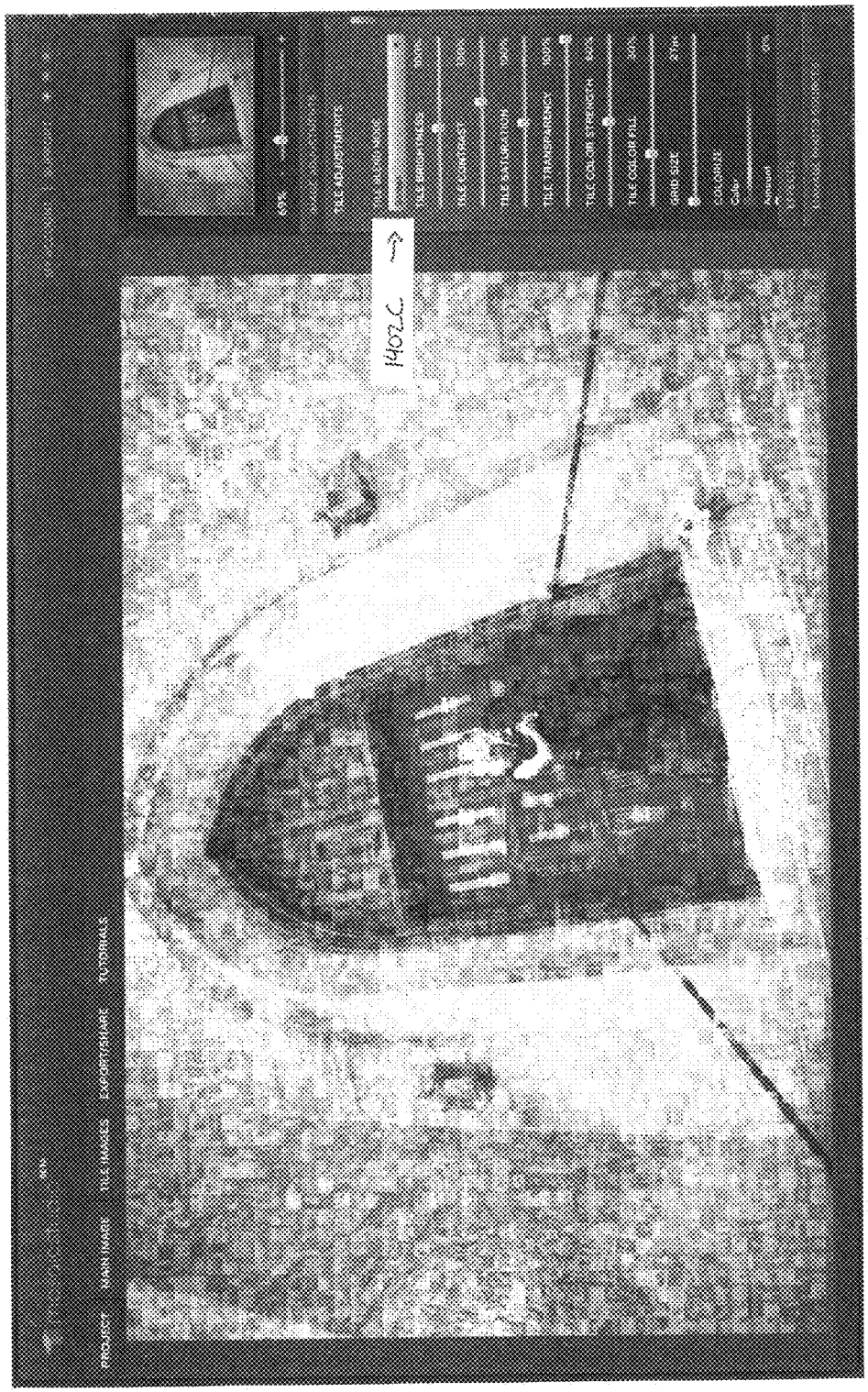
Figure 14D:
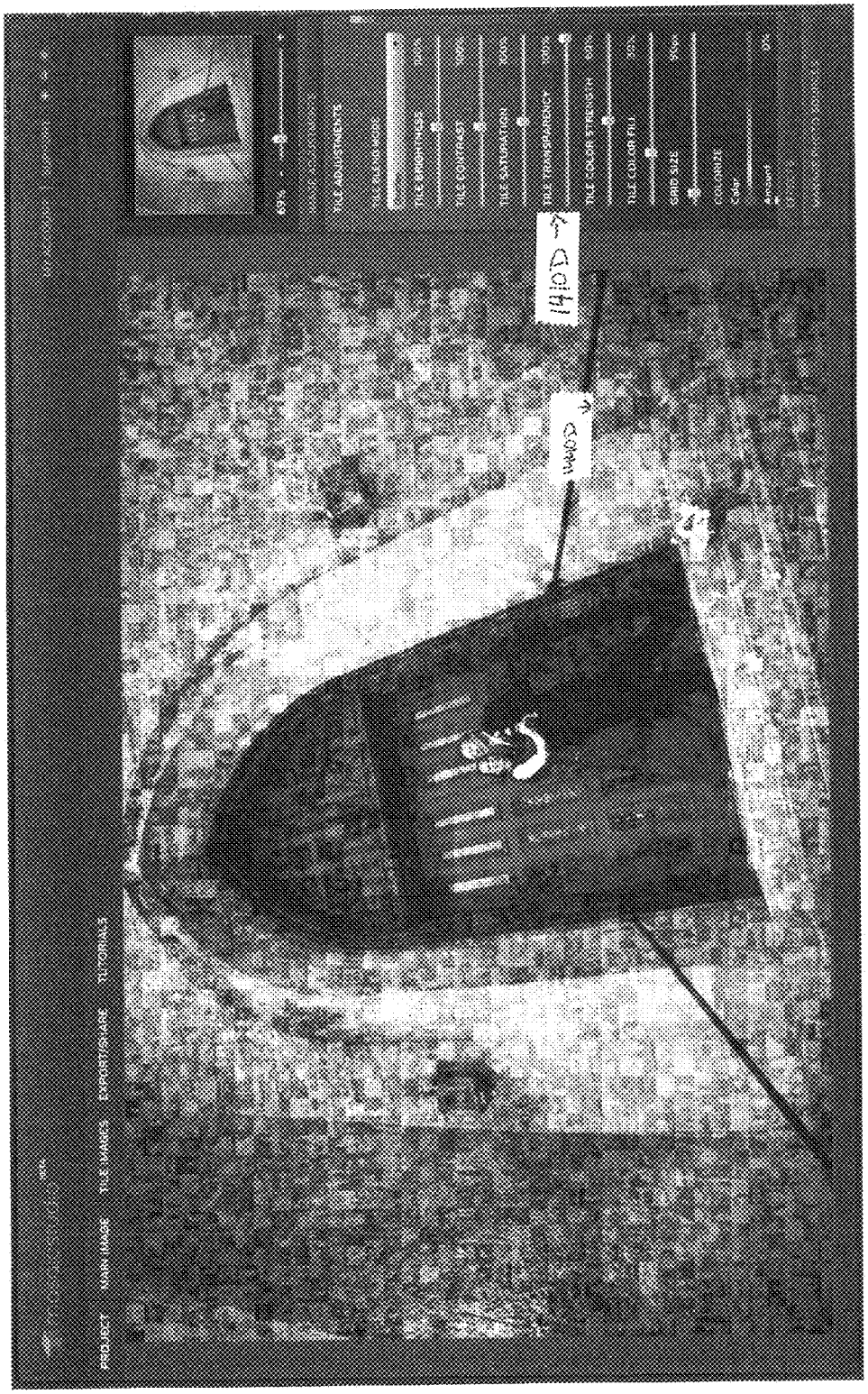

The tile transparency tool may be used to adjust the transparency, and opaqueness, of the tile images. In one embodiment, as seen in FIG. 14D, a tile transparency 1410D value set to a high value, 100%, may cause the tiles to become more opaque. This may cause the tile images to become more readily identifiable. Conversely, as seen in the embodiment of FIG. 14E, a tile transparency value 1410E set to a low value, 35%, may cause the tile to become more transparent. This may make the tiles images more difficult to distinguish to the observer while causing the base image to become more focused. For example, image tile 1440D in FIG. 14D of a woman's portrait is more opaque than the same image tile 1440E in FIG. 14E.

The polishing engine creates an image, the polished image, that may be comprised of a tile image layer and base image that may have been overlaid and blended. In some embodiments, this may be done such that the polished image allows a viewer of it to easily see and recognize the base image. In some embodiments, the polished image may be the final mosaic image. In other embodiments, the user may be able to apply different effects or adjustments to the polished image, as discussed further below.

The Effects Engine

Figure 15:
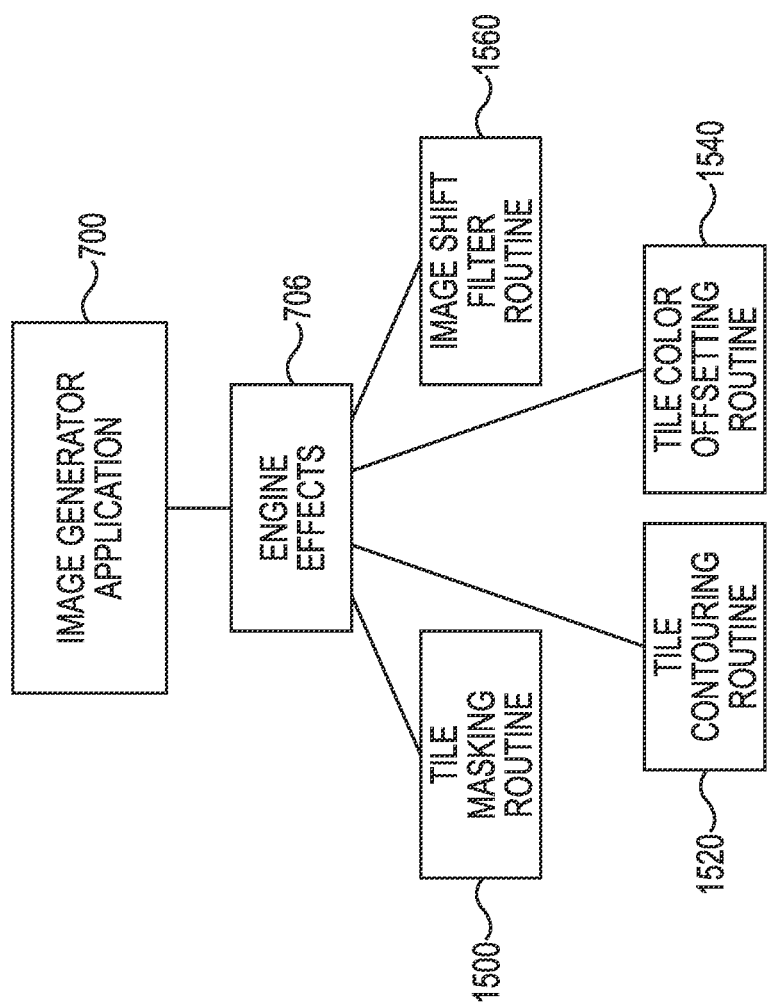
FIG. 15 is a block diagram showing the components of the effects engine in accordance with some embodiments of the present disclosure.

The Effects Engine may be used to apply a variety of effects to the polished image, giving the user greater artistic control over the look of the final mosaic image. As seen in FIG. 15 the Effects Engine 706 may be comprised of one or more routines used to apply the various effects to the polished image. It will be understood that the use of the teems "engine," "routine," or "tool," are not intended to be limiting and are interchangeable. In some embodiments, for example, the effects engine may be comprised of a tile masking routine 1500, a tile contouring routine 1520, a tile color offsetting routine 1540, and an image shift-filter routine 1560. It will be understood that the effects engine 706 may include more, less, or different routines in other embodiments. It will further be understood that all embodiments disclosed herein are not intended to be limiting and that other embodiments may include additional or different features that those explicitly described herein.

The Tile Masking Routine

Figure 16:
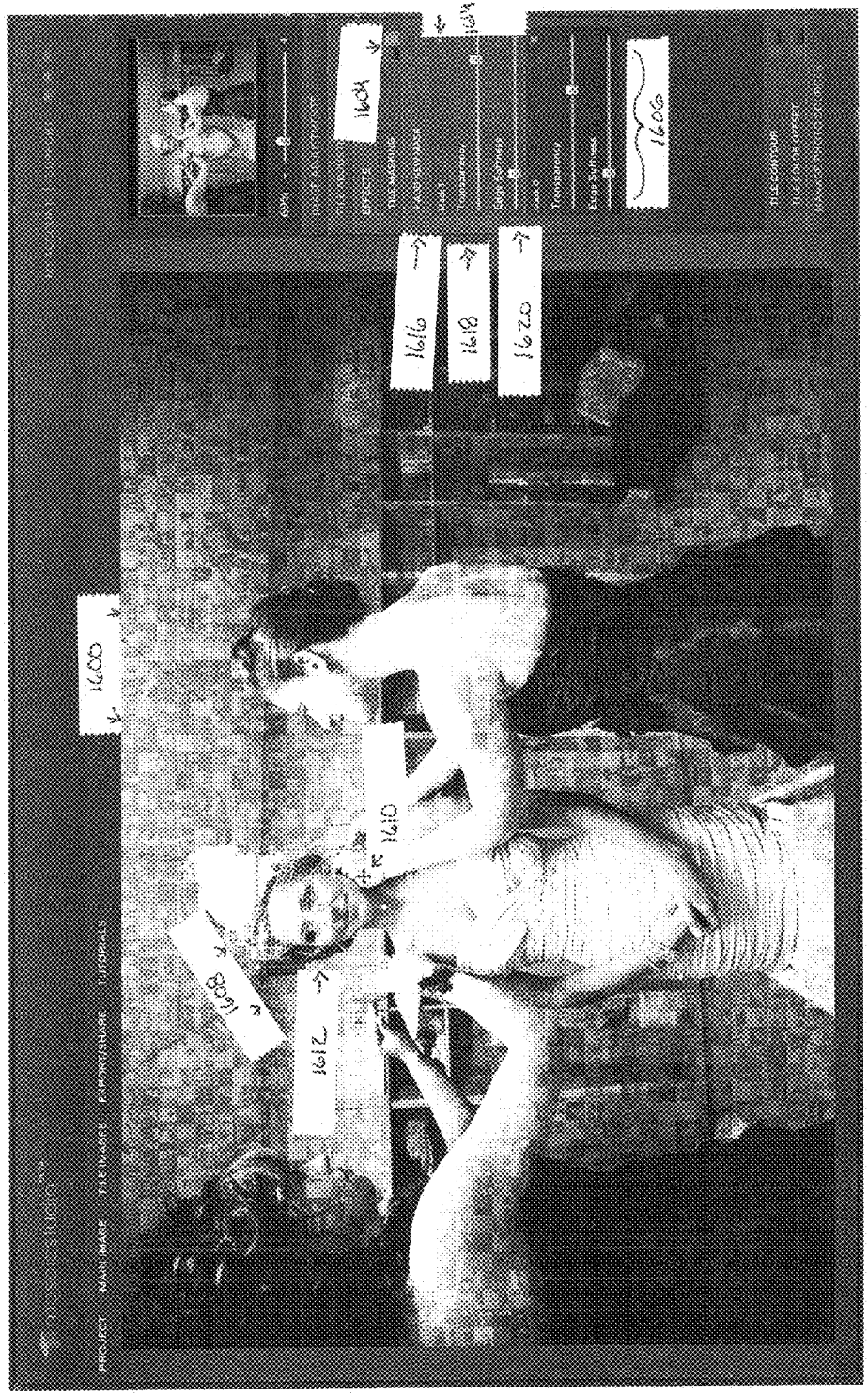
FIG. 16 shows an image that has had masking applied to it to adjust the image properties of the image according to some embodiments of the present disclosure.

The tile masking routine 1500 may limit the mosaic effect in a particular region of the polished image. The tile masking routine 1500 may include one or more tools, that may be used to mask a region in different ways. In some embodiments for example, the tile masking routine 1500 may have a mask transparency tool, an edge softness tool, a face finder tool, and a reverse masking tool. A user may turn the tile masking routine on/off. As shown in FIG. 16, masking may be accomplished by selecting the tile masking box 1604. In this embodiment, the system may change the box from red to green to show the user the routine is on. The system may display a tile masking window 1606 with a new mask title and tools. These tools may include, but are not limited to, mask transparency and edge softness. The system may also create a masking rectangle 1608 to control the placement and size of the masking area. While the tool is described as using a rectangular shape to define the masked area, it will be understood that other shapes may be used to define the area to be masked. In some embodiments, a user may define the shape to be used. As in the embodiment presented in FIG. 16, the system may generate a name for the mask, "Mask 1." In other embodiments, the user may be able to type in a name for each new mask created. Each individual mask may be deleted without turning off the effect, for example by clicking a small "x" 1614. Another embodiment, with touch screen capabilities may allow a user to swipe from left to right across the mask within the tile masking window 1006, allowing a user to move, delete, or cancel a mask or action associated with the mask for example. However, any method that would remove the mask from the final mosaic image may be sufficient. In some embodiments a user may add one or more masks by clicking a button "+ add new mask" 1616.

The Mask Transparency Tool

The mask transparency tool may be used to adjust the transparency of the tile image(s), just as with the tile transparency tool discussed above, but it may or may also apply the effects to masked area. In one embodiment, sliding the mask transparency marker all the way to the right on bar 1618 may make the tile images within the masking shape completely transparent. This effect may make the base image appear more focused. For example, as FIG. 16 demonstrates, the woman's face with the mask 1608 around it appears more focused than the other faces in the final mosaic image 1600. Sliding the mask transparency marker along the horizontal bar to the left may make the tile images increasingly more opaque. A user may adjust the transparency level to achieve the desired transparency effect. The image viewer window may substantially immediately respond to a user's changes to show the user the effect of change.

The Face Finder Tool

In one embodiment, the effects engine may also include a face finder tool. Any suitable face recognition program for identifying faces in an image may be used. A user may apply a mask to any faces identified in a given image by the face finder tool, for example.

The Edge Softness Tool

An edge softness tool may be used to change the edge softness of the tile images along a mask shape's boarders, for example. A may defined how much edge softness to apply. For example, a user may indicate how many pixels should be included in the softening area. As seen in FIG. 16A, a hard edge 1610A may cause a hard line 1612A defining the area the user has masked. A soft edge 1602A may increase the distance (in pixels) thereby allowing for a more gradual scaling 1630 of the transparency values.

The Reverse Masking Tool

In some embodiments, a reverse masking tool may be available. The reverse masking tool is generally the opposite of the masking tool. A user may select an area in which tile images may be seen. However, outside of the selected area, only the base image may be seen.

The Tile Contouring Routine

The Tile Contouring Routine 1520 may allow image displacement on the tile image layer. The Tile contouring routine 1520 may displace pixels in the tile image layer, shifting them away from their original location to some extent. The result may be a shifted, warped, wrapped, or mottled look. The amount of displacement applied may be determined by the color value of the base image. The tile contouring routine 1520 may have one or more tools used to contour the tile images. In one embodiment, as seen in FIG. 17, these tools may be presented in a tile contouring window 1702, and may include, but are not limited to: a horizontal displacement tool 1706, a vertical displacement tool 1708, a horizontal softness tool 1710, and a vertical softness tool 1712.

A horizontal displacement tool may be used to change the value of the color of the base image by changing the position of one or more pixels. For example, blue or red tinted pixels in the base image may be shifted along their horizontal, or x-axis border. The vertical displacement tool may have the same result, only along the vertical, or y-axis border of the tile image. The horizontal softness tool may determine how strong the displacement is along the horizontal border of the tile image. Similar to edge softening, the horizontal softening tool may determine a length of space in pixels along which the displacement result must occur. The vertical softening tool may have the same result, only along the vertical, or y-axis border of the tile image.

Figure 17:
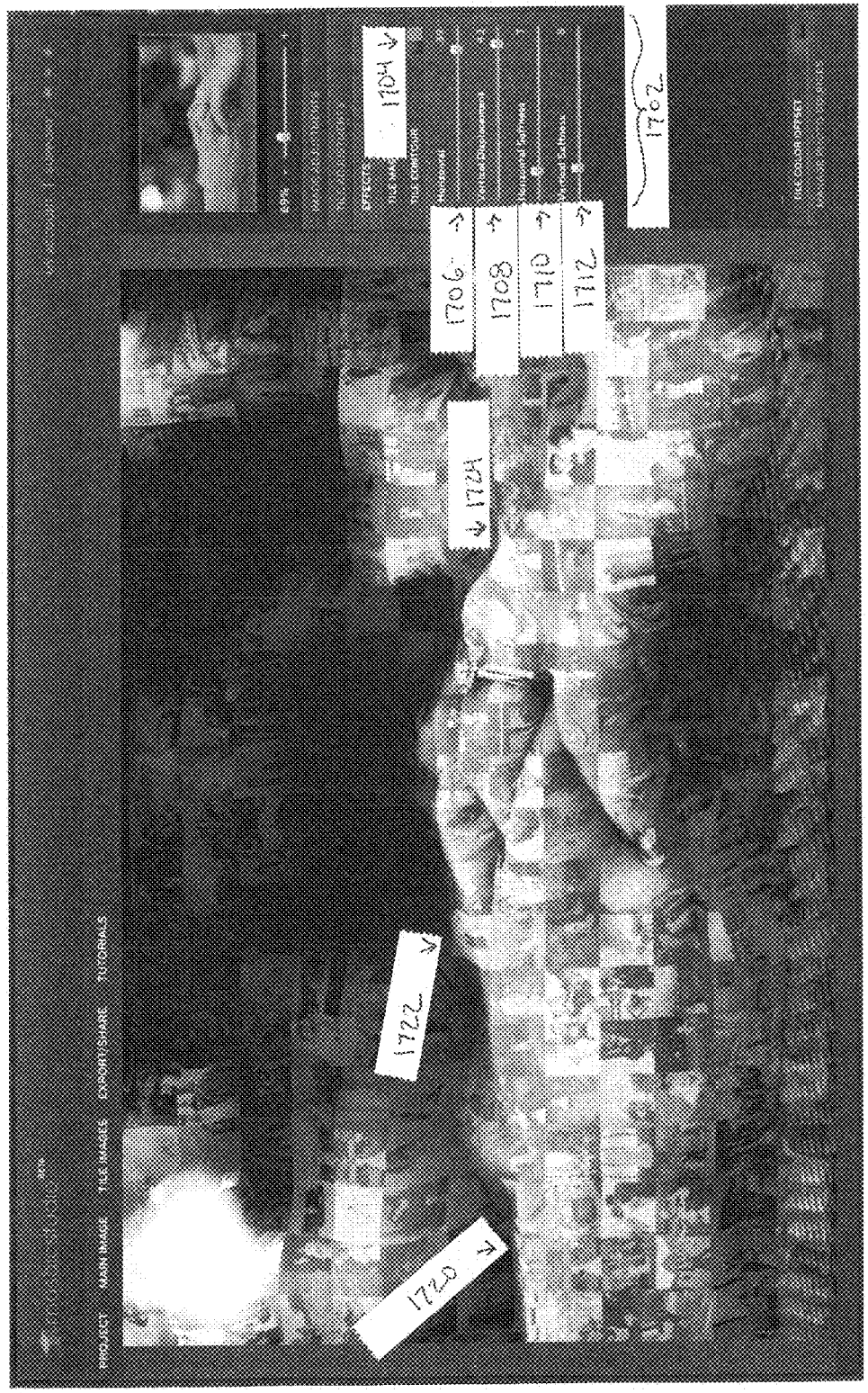
FIG. 17 shows an image that has had contouring effects applied to it to adjust the image properties in accordance with some embodiments of the present disclosure.

One example of the tile contouring tool's displacement feature can be seen in FIG. 17. At points marked 1720, 1722, and 1724 the displacement or shifting can be seen. The effect of applying this tool is that a tile image appears to wrap around the contours of the hand.

The Color Offsetting Routine

The tile color offsetting routine 1540 may be used to generally offset the tint of one or more tile images, which may originally have matched that of the base image that shared the same cell as the tile image. The tile image may be tinted a color, not from the cell image directly below the tile image, but from a cell image in a different region of the base image. For example, a tile image may originally have been tinted red to match the underlying cell image. The offsetting routine may change the tint of the tile image to blue to match the tint of a cell image that is five cell images to the left. The new tint of the tile image, and other tile images in the region, may cause a secondary image to appear that matches part of the base image, creating a sort of echo image.

A user may turn the tile color offset tool on/off. As seen in FIG. 18, this may be done by selecting a box 1804 labeled "tile color offset" that may cause the system to display a green "on" indicator. The system may display a tile color offset window 1206. This window may display a mini viewing window 1820, which may display all, or a portion, of the base image that may be an echo image in the final mosaic image. The window may also show options for color offset that include, but are not limited to: offset scale, right-left offset, top-down offset. Moving the marker along the offset scale bar 1822 may cause the echo image to shrink, (which may cause more of the base image to be visible as an echo image) or enlarge (which may cause less of the base image to be visible as an echo image). The right-left offset, or "left offset" 1824 option as it is seen in FIG. 18, may cause the echo image to shift left or right along the X-axis. The top-bottom offset, or "Top offset" 1826 option as seen in FIG. 18, may cause the echo image to shift up or down along the Y-axis. As seen in the embodiment of FIG. 18, the base image is that of two red shoes, which as part of the final mosaic image have been marked at precise points 1808A and 1810A. The echo image is an enlarged base image that has been shifted to the left and that has been marked to identify the same parts of the red shoes as above at, respectively, 1808B, and 1810B.

In another embodiment, a duplicate image of all of or a portion of the base image may be duplicated and placed over the original base image to create a "ghost image." The ghost image may be moveable and adjustable by the user. The system may be used to tint any area of the final mosaic image that contains all, or part of the ghost image to match the tint of the ghost image overlay. However, any method used for creating an echo image by offsetting tile color may be used.

The Tilt-Shift Filter Routine

A user may turn the tilt-shift filter effect on/off. The effect of the tilt-shift filter is to create a tilt-shift lens look on the main image; a look having a short depth of field and a very narrow area that is in focus, with the rest of the image blurring out. In one embodiment, clicking on a box labeled "tilt-shift filter" may turn the effect on. A circle, or any suitable shape, may appear on top of the final mosaic image that may have moving and scaling functionality. The image within the circle may be focused, while the image outside the circle may become increasingly blurred as it feathers away from the circle's border. Moving the circle may allow for a different region of the image to become focused. Scaling the circle, to enlarge it, may allow a greater region to remain in focus. It is understood that any method that achieves this effect will be sufficient.

As seen in FIG. 18, one embodiment may have a zoom preview 1850, and scaling 1852 ability that may allow the user to visualize with greater detail what adjustments to the image may do to objects in the picture. For example, a user may zoom in on faces in an image to ensure that changes made had a beneficial outcome. Another embodiment may allow a user to scan over the image. A shape may appear that had the underlying image magnified. A user may be able to select one or more magnification options.

Products Based on the Final Image

In some embodiments a user may also be able to purchase standard prints, posters, canvas, metal reproductions, or any other suitable reproducible copies of the final mosaic image. The system may allow a user to order final mosaic image. In some embodiments, the user may choose how the final image will be printed (e.g. printed on canvas, on standard photographic paper, etc.), and the size of the final image. In some embodiments, the user may be able to select the retailer that may produce the image. A home delivery option may be available in some embodiments. The system may prompt the user for billing information in response a user request to order one or more products. The billing information may include but is not limited to: name, billing address, recipient, shipping address, credit card number, credit card expiration date, ccv code, PayPal account information, check or money order information, or any other information that may be required for any suitable method of payment.

In some embodiments, a user may opt to have a product created for them using their final mosaic image. The base and tile images and/or the final image may be transmitted by any suitable method to an artist or designer who may use the images to create one or more products from the final mosaic images. An image of the product using the final mosaic image(s) may be sent to the user for approval before being saved, exported, printed, or purchased.

Embodiments of the present disclosure may be tailored for use by specific categories of users. For example, one embodiment for professionals may comprise all engines, routines, and tools listed above. Another embodiment for a mobile device may have an IGA comprising the rough image engine, the polishing engine, and the masking routine of the effects engine. In another embodiment, the system may include the rough image engine and the polishing engine, but may lack the manual blend tools. Such a system may be used for mobile applications to limit the amount of memory needed to run the system, for example. Such a system may be directed to users that are younger or less experienced with photographic applications. It is understood that varying embodiments may be constructed from any and all features of the present disclosure for various categories of users.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

One or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

I claim:

1. A computer-implemented method for creating a final mosaic image, the method comprising:
   receiving a main image from a database of images;
   generating a grid overlay having one or more grid cells, the grid overlay being coupled with the main image such that the one or more grid cells each include a portion of the main image to create one or more image cells;
   for each of the one or more image cells, analyzing the image cell to detect a pre-existing tint value of a pixel substantially at the center of the cell;
   receiving one or more tile images from the database of images, each tile image including a plurality of pixels, wherein each pixel has a native state tint value;
   positioning one of the one or more tile images into each of the one or more image cells to create one or more tiled cells, without a matching step that matches any native state tint value of a tile image with a tint value of the image cell into which the tile image is positioned;
   for each tile image, automatically changing the tint value of the plurality of pixels from the native state tint value to the tint value detected at the center of the image cell that each of the tile images has been positioned in; and
   generating a polished image.

2. The method of claim 1, further comprising:
   receiving an image property value to be assigned to one or more of the tiled cells.

3. The method claim 2, wherein the image property value is for color amount.

4. The method of claim 2, wherein the image property value is for blend level.

5. The method of claim 1, further comprising applying one or more effects to at least a portion of the polished engine using an effects engine.

6. The method of claim 5, the one or more effects including a masking effect, the masking effect comprising:
   assigning a mask area to a portion of the polished image;
   adjusting a transparency value for one or more of the tile images positioned in cell images within the mask area.

7. The method of claim 5, the one or more effects including a tilt-shift filter routine, the tilt-shift filter routing comprising:
   assigning a focus area to the polished image to create an area inside of the focus area and an area outside of the focus area;
   blurring the area outside of the focus area.

8. The method of claim 5, the one or more effects including an image property adjusting effect comprising:
   receiving the polished image and an input value for one or more image properties;
   adjusting the input value for the one or more image properties to give a modified value;
   assigning the modified value to the image property; and
   regenerating the polished image based on the modified value.

9. A computer-implemented system for creating final mosaic images, the system comprising:
   one or more databases for storing a library of images as non-transitory computer readable media; and
   a computer-implemented image generating application that uses one or more of the images stored in the library to produce a final image as non-transitory computer readable media, the image generating application comprising:
   a rough image engine that uses computer executable instructions to:
   create a base image layer, the base image layer being selected by a user from the library of images, the base image layer being divided into a plurality of image cells; and
   create a tile image layer that is created from one or more tile images selected by the user from the library of images, each tile image including a plurality of pixels, wherein each pixel has a native state tint value;
   wherein the base image layer and the tile image layer are coupled together one on top of the other such that a tile image is coupled to each image cell, without a matching step that matches any native state tint value of a tile image with a tint value of the image cell to which the tile image is coupled; and
   a polishing image engine that uses computer executable instructions to:
   analyze the base image layer to detect a pre-existing tint value for a pixel substantially at the center of each of the plurality of image cells;
   for each of the one or more tile images, automatically change the tint value of the plurality of pixels from the native state tint value to the tint value detected at the center of the image cell that each of the tile images has been positioned in; and
   create a polished image.

10. The system of claim 9, further comprising an effects engine that uses computer executable instructions to adjust one or more image properties of the polished image.

11. The system of claim 10, wherein the one or more image properties includes fill color.

12. The system of claim 9, wherein the effects engine uses computer executable instructions to apply a mask to the polished image.

13. The system of claim 9, wherein the effects engine uses computer executable instructions to apply contouring to the polished image.

14. The system of claim 9, further comprising a product ordering engine, whereby, using computer executable instructions, a user can order a product that is comprised of the polished image.

* * * * *